US011221449B2

(12) United States Patent
Saeki et al.

(10) Patent No.: US 11,221,449 B2
(45) Date of Patent: Jan. 11, 2022

(54) OPTICAL CONNECTOR, OPTICAL MODULE AND CLIP MEMBER

(71) Applicant: Sumitomo Electric Industries, Ltd., Osaka (JP)

(72) Inventors: Tomoya Saeki, Osaka (JP); Yasushi Fujimura, Osaka (JP); Michio Suzuki, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 16/756,088

(22) PCT Filed: May 10, 2019

(86) PCT No.: PCT/JP2019/018811
§ 371 (c)(1),
(2) Date: Apr. 14, 2020

(87) PCT Pub. No.: WO2019/216431
PCT Pub. Date: Nov. 14, 2019

(65) Prior Publication Data
US 2020/0341202 A1   Oct. 29, 2020

(30) Foreign Application Priority Data

May 11, 2018   (JP) .............................. JP2018-092464
Nov. 20, 2018  (JP) .............................. JP2018-217506

(51) Int. Cl.
*G02B 6/38*        (2006.01)

(52) U.S. Cl.
CPC .................. *G02B 6/389* (2013.01)

(58) Field of Classification Search
CPC ................................ G02B 6/389; G02B 6/421
See application file for complete search history.

(56) References Cited

U.S. PATENT DOCUMENTS 5,588,080 A    12/1996  Kawamura
6,367,987 B1    4/2002  Beier et al.
(Continued)

FOREIGN PATENT DOCUMENTS

JP    H7-318755 A    12/1995
JP    2015-025868 A   2/2015

OTHER PUBLICATIONS

International Search Report issued in International Application No. PCT/JP2019/018811, dated Jul. 23, 2019.
(Continued)

*Primary Examiner* — Sung H Pak
(74) *Attorney, Agent, or Firm* — Baker Botts L.L.P.; Michael A. Sartori

(57) ABSTRACT

An optical connector according to an embodiment includes: a receptacle in a cylindrical shape, the receptacle being configured to hold a first optical fiber, the receptacle having a flat surface on an outer surface thereof, the flat surface being parallel with a first optical axis of the first optical fiber; a plug in a cylindrical shape, the plug being configured to hold an optical fiber, the plug having a flat surface on an outer surface thereof, the second flat surface being parallel with a second optical axis of the optical fiber; and a clip member having a contact surface the flat surface with the flat surface, the clip member being configured to press the receptacle and the plug against each other for optically coupling the first optical fiber to the second optical fiber.

16 Claims, 22 Drawing Sheets

(56) References Cited

U.S. PATENT DOCUMENTS

| | | | |
|---|---|---|---|
| 9,213,150 B2* | 12/2015 | Matsui | G02B 6/389 |
| 9,453,975 B2* | 9/2016 | Akieda | G02B 6/3821 |
| 2010/0008630 A1* | 1/2010 | Marrapode | G02B 6/3897 |
| | | | 385/78 |
| 2010/0247040 A1 | 9/2010 | Kuriki et al. | |
| 2014/0233896 A1 | 8/2014 | Ishigami et al. | |
| 2015/0185423 A1* | 7/2015 | Matsui | G02B 6/3893 |
| | | | 385/77 |
| 2016/0091670 A1 | 3/2016 | Akieda et al. | |
| 2017/0363815 A1 | 12/2017 | Mullert | |

OTHER PUBLICATIONS

Written Opinion issued in International Application No. PCT/JP2019/018811, dated Jul. 23, 2019.

* cited by examiner

OPTICAL CONNECTOR, OPTICAL MODULE AND CLIP MEMBER

TECHNICAL FIELD

The present disclosure an optical connector, an optical module and a clip member.

BACKGROUND ART

Japanese Unexamined Patent Publication No. H7-318755 describes an optical plug connector. The optical plug connector includes a housing covering an optical fiber. The housing is provided with an engagement structure that engages connectors with each other.

SUMMARY OF INVENTION

In the optical connector mounted in the inside of the case of a device, moisture resistance and strength are the second-best requests. This is because moisture resistance and strength are compensated by the case of the device. Since the optical connector mounted in the inside of the device is not repeatedly engaged and disengaged after once placed in the inside of the case, convenience for engagement is also the second-best request. On the other hand, in the optical connector mounted in the inside of the case of the device, the simplicity of the structure is requested.

In small-sized devices, such as optical transceivers, it is sometimes difficult to reserve spaces to mount components, and the optical connector is sometimes requested to be disposed between a circuit board and a case, for example. Thus, it is sometimes difficult to dispose an optical connector having a housing in a space in which components are disposed. Therefore, there are also requests to simplify the structure of the optical connector and to mount the optical connector in a limited space.

An object of the present disclosure is to provide an optical connector and an optical module that can simplify their structures and that can be mounted in a limited space.

An optical connector according to an aspect includes: a receptacle in a cylindrical shape, the receptacle being configured to hold a first optical fiber, the receptacle having a first flat surface on an outer surface thereof, the first flat surface being parallel with a first optical axis of the first optical fiber; an optical fiber holding member in a cylindrical shape, the optical fiber holding member being configured to hold a second optical fiber, the optical fiber holding member having a second flat surface on an outer surface thereof, the second flat surface being parallel with a second optical axis of the second optical fiber; and a clip member having a third flat surface in surface contact with the first flat surface and the second flat surface for aligning the first optical axis with the second optical axis, the clip member being configured to press the receptacle and the optical fiber holding member against each other for optically coupling the first optical fiber to the second optical fiber.

An optical module according to an aspect further includes, a receptacle to be used in the optical connector described above, a housing having a window on which the receptacle is attached, the housing mounting an optical element, the housing has a bottom face, and the optical element emits light having a polarization plane parallel with or vertical to the bottom face, and the third flat surface is parallel with the bottom face.

According to the optical connector and the optical module of the present disclosure, the structure can be simplified as well as the optical connector and the optical module can be mounted in limited spaces.

DESCRIPTION OF EMBODIMENTS

Figure 1:
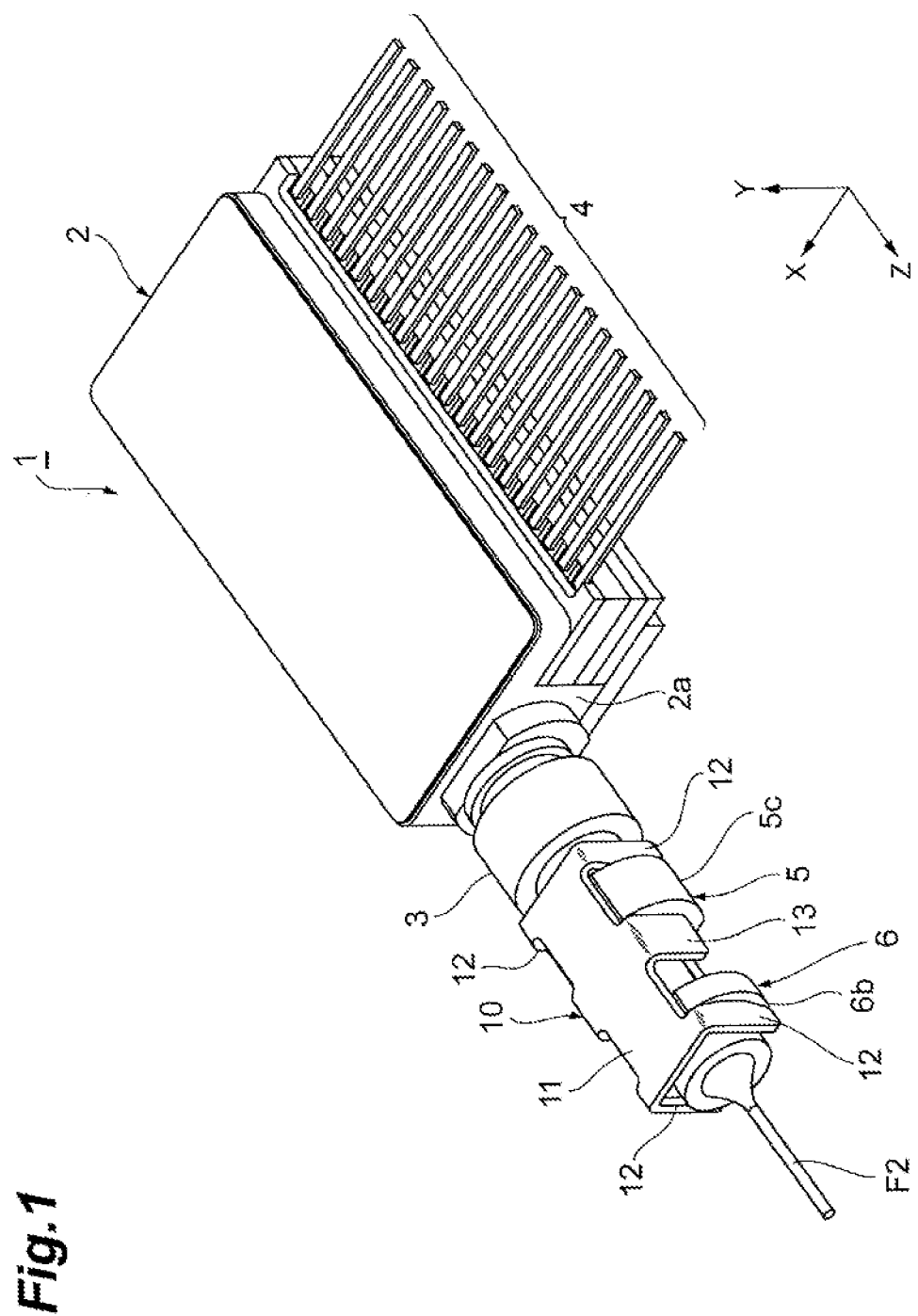
FIG. 1 is a perspective view of an optical module according to a first embodiment.

Description of Embodiment of the Disclosure of the Present Application

First, the content of an embodiment of the disclosure of the present application will be described in the list. An optical connector according to an embodiment includes: a receptacle in a cylindrical shape, the receptacle being configured to hold a first optical fiber, the receptacle having a first flat surface on an outer surface thereof, the first flat surface being parallel with a first axis of the first optical fiber; an optical fiber holding member in a cylindrical shape, the optical fiber holding member being configured to hold a second optical fiber, the optical fiber holding member having a second flat surface on an outer surface thereof, the second flat surface being parallel with a second optical axis of the second optical fiber; and a clip member having a third flat surface in surface contact with the first flat surface and the second flat surface for aligning the first optical axis with the second optical axis, the clip member being configured to press the receptacle and the optical fiber holding member against each other for optically coupling the first optical fiber to the second optical fiber.

In the optical module, the receptacle has the first flat surface, and the optical fiber holding member has the second flat surface. The clip member has the third flat surface determining the parallelism of the first flat surface with the second flat surface. The clip member keeps the state in which the optical fiber holding member is joined to the receptacle with the parallelism of the first flat surface with the second flat surface determined by the third flat surface. Thus, the optical fiber holding member and the receptacle are held on the clip member, and hence the optical fiber holding member and the receptacle can be held with a simple configuration. The receptacle and the optical fiber holding member are held with the parallelism of the first flat surface with the second flat surface determined by the third flat surface, and hence the receptacle and the optical fiber holding member can be reliably held with a small-sized clip member. The parallelism of the first flat surface with the second flat surface is determined, and hence this stops the clip member, the receptacle, and the optical fiber holding member from coming out of the housing. Thus, the clip member, the receptacle, and the optical fiber holding member can be reliably accommodated in the inside of the optical transceiver. Consequently, the optical module can also be reliably mounted in a limited space, such as the inside of the optical transceiver.

The second optical fiber is a polarization maintaining fiber (PMF), and the second optical fiber has a slow axis or a fast axis each parallel with the third flat surface. Therefore, since the second optical fiber held on the optical fiber holding member is a polarization maintaining fiber, the optical fiber holding member and the receptacle joined to each other are held on the clip member. Thus, optical signals can be outputted from the optical fiber holding member in a correct polarized state.

The first optical fiber may be a polarization maintaining fiber, and the first optical fiber has a slow axis or a fast axis each parallel with the third flat surface. In this case, the first optical fiber held on the receptacle is a polarization maintaining fiber, the polarization maintaining fiber is used on the receptacle, and hence the polarization characteristics can be further improved.

The clip member may have a first retainer and a second retainer. The receptacle may have a first cylindrical flange. The optical fiber holding member may have a second cylindrical flange. The first retainer may have a first protrusion configured to press the first cylindrical flange toward the second cylindrical flange, and the second retainer may have a second protrusion configured to press the second cylindrical flange toward the first cylindrical flange. In this case, the first cylindrical flange and the second cylindrical flange are individually pressed by the protrusions, and hence the pressure against the first cylindrical flange and the second cylindrical flange can be improved. Thus, the optical fiber holding member and the receptacle that are joined to each other can be more firmly held.

The first cylindrical flange of the receptacle and the second cylindrical flange of the optical fiber holding member may be made of a stainless steel or an alloy including stainless steel. Stainless steel materials are of high durability and of excellence in environmental resistance performance, such as high temperature and high humidity. Thus, the durability and environmental resistance performance of the first cylindrical flange and the second cylindrical flange can be improved.

The receptacle may have a first recess, and the first protrusion of the first retainer of the clip member fits into the second recess. In this case, the receptacle is pressed by the first protrusion of the first retainer, and hence the receptacle and the optical fiber holding member that are joined to each other can be firmly held. Since the receptacle has the first recess, the protrusion is entered into the first recess. Thus, the possibility that the first retainer comes off from the receptacle can be more reduced. That is, even in the case in which vibrations, for example, are applied, the protrusion is in contact with the inner surface of the first recess, and the first retainer can hardly come off from the receptacle.

The optical fiber holding member may have a second recess and the second protrusion of the second retainer of the clip member fits into the second recess. In this case, the optical fiber holding member is pressed by the protrusion of the second retainer, and hence the optical fiber holding member and the receptacle that are joined to each other can be firmly held.

Specifically, since the optical fiber holding member has the second recess, the protrusion is entered into the second recess. Thus, the possibility that the second retainer comes off from the optical fiber holding member can be more reduced. That is, even in the case in which vibrations, for example, are applied, the protrusion is in contact with the inner surface of the second recess, and the second retainer can hardly come off from the optical fiber holding member.

The first recess may be in a groove shape extending along a circumferential direction of the first cylindrical flange. The second recess may be in a groove shape extending along a circumferential direction of the second cylindrical flange. In this case, the first recess or the second recess are in a groove shape extending along the circumferential direction of the cylindrical flanges, and hence the recesses can be the shape cut along the circumference of the cylindrical flange. Thus, the processing costs of the first recess or the second recess can be decreased.

The clip member may include a pair of first retainers and a plate-shaped part. The first retainers may extend from the plate-shaped part. The first retainers may be inclined so that tips of the first retainers are brought close to each other as apart from the plate-shaped part. In this case, the contact points of the first retainers with the receptacle are located on the lower side of the center point of the receptacle, and the pressing force of the first retainer works toward the upper side. Consequently, the receptacle is pushed to the upper side of the first retainer, and hence the receptacle can hardly come off from the clip member.

The clip member may include a pair of second retainers and a plate-shaped part. The second retainers may extend from the plate-shaped part. The second retainers may be inclined so that tips of the second retainers are brought close to each other as apart from the plate-shaped part. In this case, similarly to the description above, the contact points of the second retainers with the optical fiber holding member are located on the lower side of the center point of the optical fiber holding member, and the pressing force of the second retainer works toward the upper side. Thus, the optical fiber holding member is pressed on the upper side of the second retainer, and hence the optical fiber holding member can hardly come off from the clip member.

An optical module according to an embodiment includes the above-described optical connector. The optical connector further includes a housing having a window on which the receptacle is attached, the housing mounting an optical element. The housing has a bottom face. The optical element emits light having a polarization plane parallel with or vertical to the bottom face. The third flat surface is parallel with the bottom face.

In the optical module, the housing may have a top face opposite to the bottom face of the housing. The third flat surface may be located between the bottom face and the top face. The receptacle has a first length from the first flat surface to an edge opposite to the first flat surface on the first cylindrical flange of the receptacle, and the optical fiber holding member has a second length from the second flat surface to an edge opposite to the second flat surface on the second cylindrical flange, the first length and the second length may be shorter than a length from the bottom face to the top face of the housing. In this case, the clip member, the optical fiber holding member, and the receptacle can be made more compact, and hence the optical module can be more reliably mounted in a limited space, such as the internal space of an optical transceiver. A clip member may have a pair of first retainers, a pair of second retainers and a plate-shaped part connecting the pair of the first retainers to the pair of the second retainers, the plate-shaped part having a flat surface. The first retainers extend outward from the plate-shaped part, and the first retainers are inclined tips of the first retainers are brought close to each other as apart from the plate-shaped part. The second retainers extend outward from the plate-shaped part, and the second retainers are inclined so that tips of the second retainers are brought close to each other as apart from the plate-shaped part. the clip member may include a handle arranged between the first retainer and the second retainer. The handle arranged with a middle of the first and the second retainer of the clip member.

Detail of Embodiments of the Disclosure of the Present Application

In the following, specific examples of the optical connector and the optical module according to embodiments of the disclosure of the present application will be described with reference to the drawings. Note that the present invention is not limited to exemplary embodiments below, and is intended to include all of modifications and alterations described in claims and in the scope of the equivalents of claims. In the description of the drawings, the same or corresponding components are designated with the same reference signs, and the duplicate description is appropriately omitted. In the drawings, a part of the drawing is sometimes simplified or exaggerated, and dimensions and ratios, for example, are not limited to the dimensions and ratios of the drawings.

First Embodiment

Figure 2:
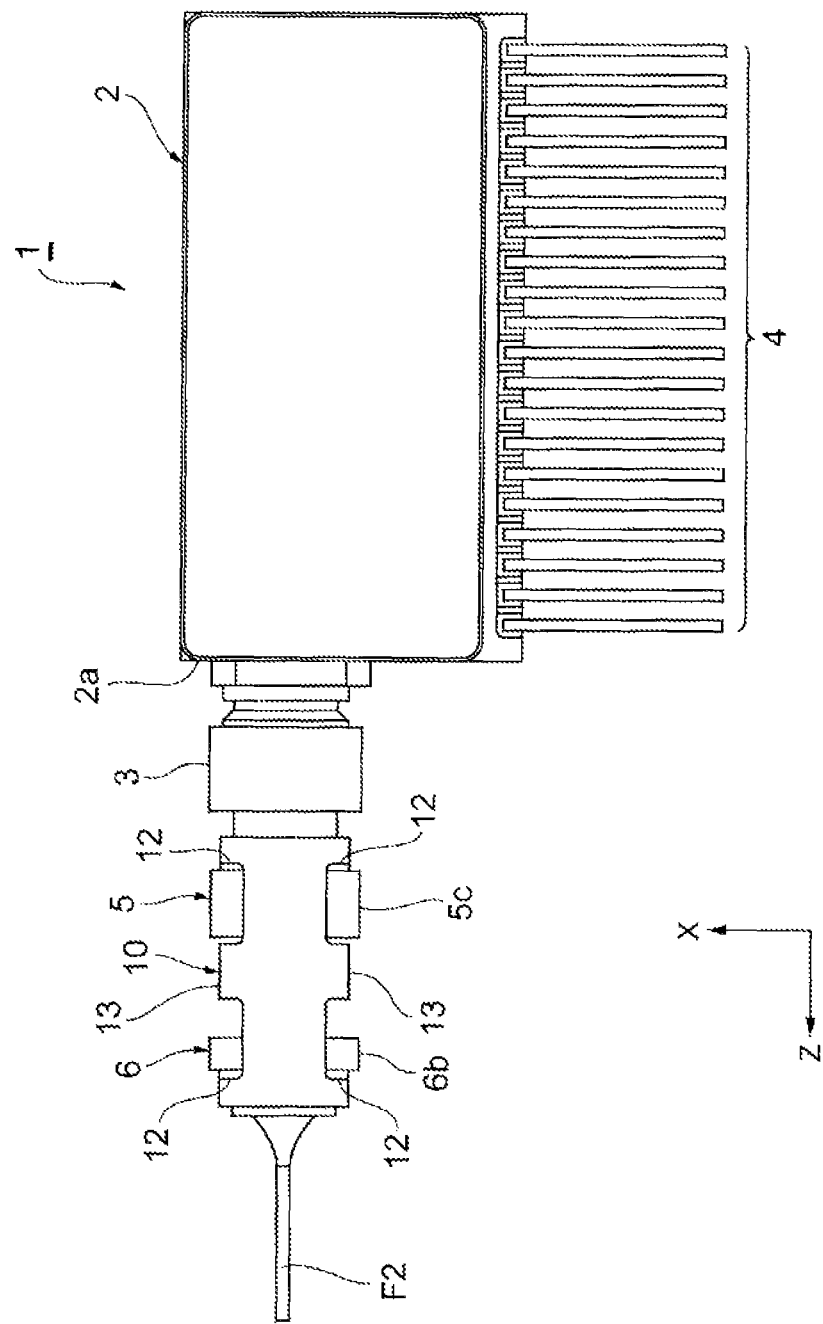
FIG. 2 is a plan view of the optical module in FIG. 1.

FIG. 1 is a perspective view of an optical module 1 according to the first embodiment including optical connector. FIG. 2 is a plan view of the optical module 1. Note that in the drawings, for easy understanding, an XYZ rectangular coordinate system is shown. For example, the optical module 1 is a coherent light source module mounted in the inside of an optical transceiver, i.e., a wavelength tunable light source (a wavelength tunable laser).

The optical module 1 includes a housing 2 in a rectangular cuboid shape and an optical fiber introduction part 3 fixed to the housing 2. The housing 2 has four side walls. Among the four side walls of the housing 2, a side wall 2a having a window is provided with a cylindrical optical fiber introduction part 3 having the center axis extending in the Z-direction and a receptacle 5. The optical fiber introduction part 3 protrudes from the side wall 2a to the outer side of the housing 2. The optical fiber introduction part 3 is cylindrical extending in the Z-direction, for example.

On at least one side wall of the housing 2 except the side wall 2a, a plurality of terminals 4 is provided. The plurality of terminals 4 is led out from multi-layered ceramics, for example, configuring the side walls of the housing 2. The plurality of terminals 4 includes a terminal that controls oscillation wavelengths from a semiconductor laser (LD), a terminal that controls temperatures, a terminal that monitors optical outputs, and any other terminals.

Figure 3:
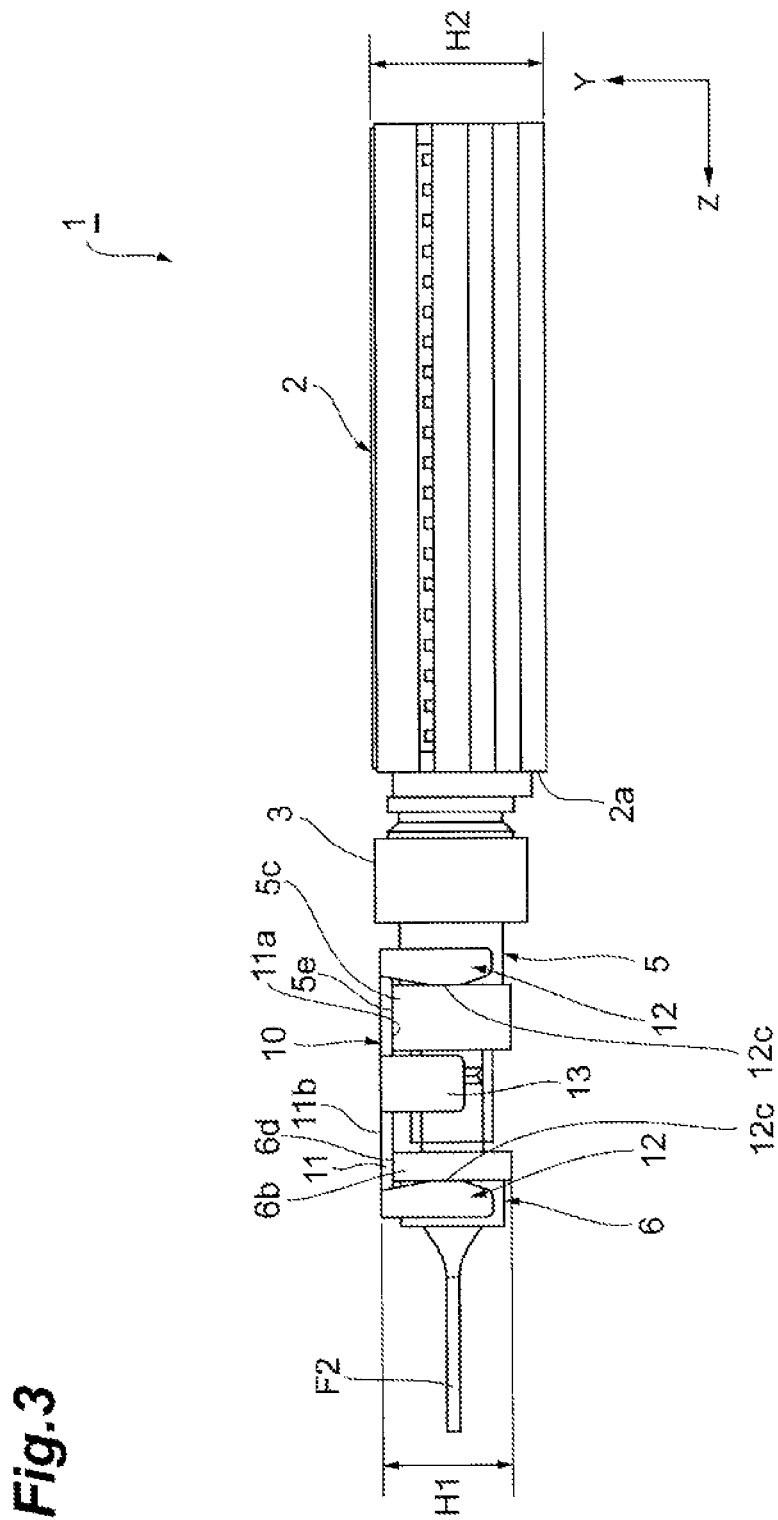
FIG. 3 is a side view of the optical module in FIG. 1.

FIG. 3 is a side view of the optical module 1 including the housing 2 and the optical fiber introduction part 3. The optical module 1 includes the receptacle 5 provided on the optical fiber introduction part 3, a plug 6 (an optical fiber holding member) joined to the receptacle 5, and a clip member 10 that holds the state in which the receptacle 5 is joined to the plug 6. The optical connector according to the embodiment includes the receptacle 5, the plug 6, and the clip member 10. As shown in FIG. 3, a thickness H1 (the height in the Y-direction) of the receptacle 5, the plug 6, and the clip member 10 is shorter than a thickness H2 of the housing 2, achieving a low profile.

Figure 4:
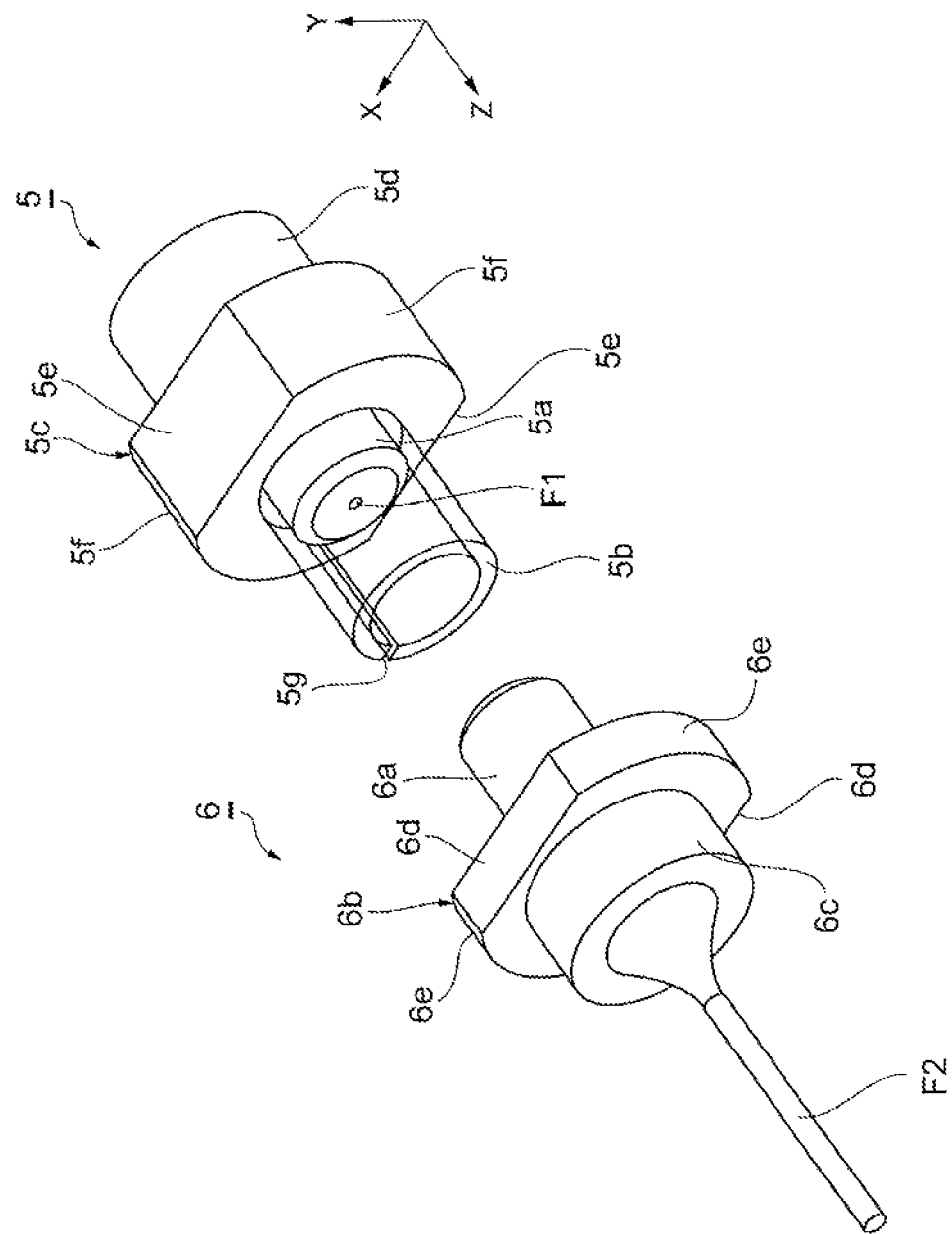
FIG. 4 is a perspective view of the receptacle and the optical fiber holding member of the optical module in FIG. 1.

FIG. 4 is a perspective view of the receptacle 5 and the plug 6. As shown in FIG. 4, the receptacle 5 includes a stub 5a that holds an optical fiber F1 (a first optical fiber), a metal holder having a flange 5c (a first cylindrical flange) that accommodates the stub 5a, and a cylindrical sleeve 5b attached to the stub 5a. The metal holder having the flange 5c is provided with a cylindrical part 5d. Note that in FIG. 4, for easily understanding the drawing, the stub 5a, for example, accommodated in the inside of the sleeve 5b is depicted by a solid line. The optical fiber F1 is a polarization maintaining fiber (PMF), for example. The sleeve 5b has a cylindrical shape, for example, and is a split sleeve having a slit 5g extending from the end face in the axial direction of the sleeve 5b.

The flange 5c is increased in diameter to the sleeve 5b and the cylindrical part 5d. The flange 5c is made of stainless steel, for example. The outer surface of the flange 5c includes a pair of flat surfaces 5e directed to the Y-direction and a pair of curved surfaces 5f curved in an arc shape between the pair of flat surfaces 5e. The flat surface 5e is flat formed by cutting the flange 5c increased in diameter in a circular shape. That is, the flat surfaces 5e are surfaces that the flange 5c is D-cut, for example. The pair of flat surfaces 5e are provided along the Y-direction, and hence the height of the receptacle 5 in the Y-direction can be lowered.

Figure 5:
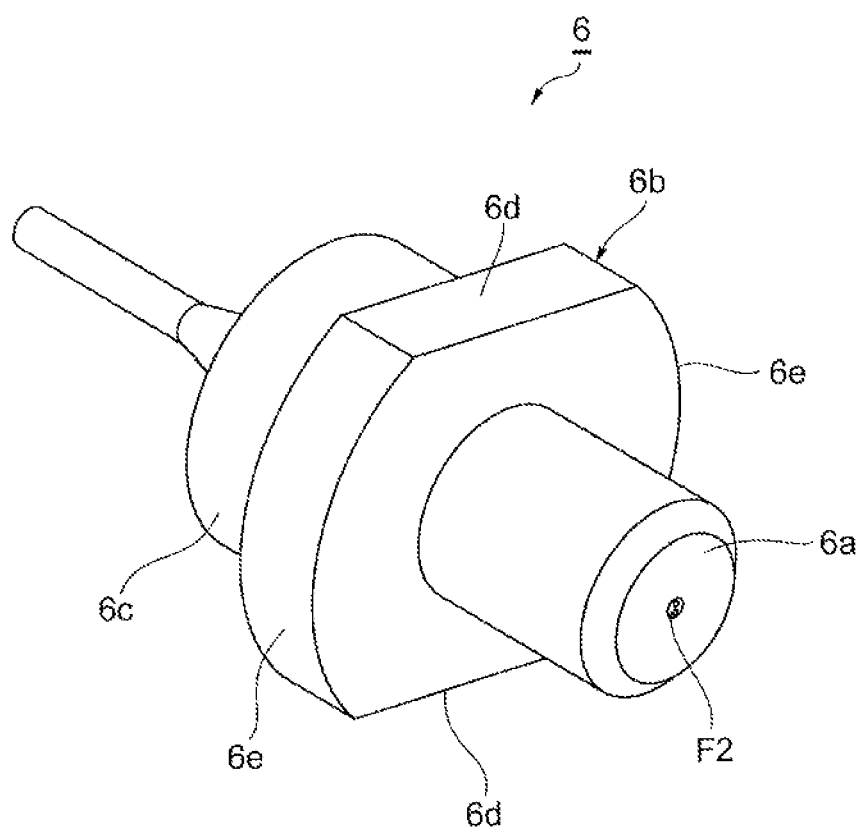
FIG. 5 is a perspective view of the optical fiber holding member.

FIG. 5 is a perspective view of the plug 6 shown from the direction different from the direction in FIG. 4. As shown in FIGS. 4 and 5, the plug 6 includes a stub 6a that holds an optical fiber F2 (a second optical fiber) and a flange 6b (a second cylindrical flange) increased in diameter from the stub 6a. The flange 6b includes a cylindrical part 6c. The flange 6b is made of stainless steel, for example. The diameter of the cylindrical part 6c is the same as the diameter of the cylindrical part 5d, for example. The optical fiber F2 extends from the cylindrical part 6c to the plug 6 outward.

Figure 6:
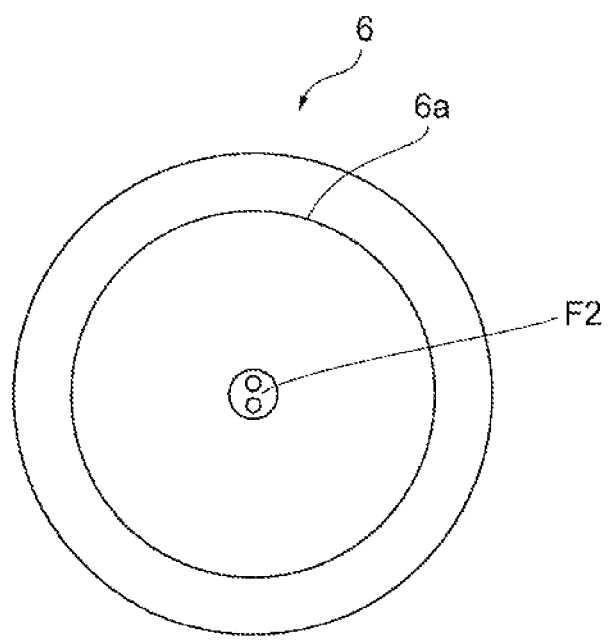
FIG. 6 is a front view of the optical fiber holding member in FIG. 5 and a polarization maintaining fiber.

FIG. 6 is a front view of the stub 6a that holds the optical fiber F2 and the optical fiber F2. As shown in FIGS. 4, 5, and 6, the optical fiber F2 is a polarization maintaining fiber, for example. The stub 6a is inserted into the sleeve 5b of the receptacle 5 to connect the optical fiber F2 to the optical fiber F1, and hence the plug 6 is optically coupled to the receptacle 5.

The flange 6b is increased in diameter to the stub 6a and the cylindrical part 6c. The outer surface of the flange 6b includes a pair of flat surfaces 6d directed to the Y-direction and a pair of curved surfaces 6e curved in an arc shape between the pair of flat surfaces 6d. The flat surfaces 6d are flat surfaces that the flange 6b increased in diameter in a circular shape is D-cut. The pair of flat surfaces 6d are provided along the Y-direction, and hence the height of the plug 6 in the Y-direction can be shortened. For example, the distance (the height of the plug 6 in the Y-direction) between the pair of flat surfaces 6d of the flange 6b is almost the same as the distance (the height of the receptacle 5 in the Y-direction) between the pair of flat surfaces 5e of the flange 5c.

Figure 7A:
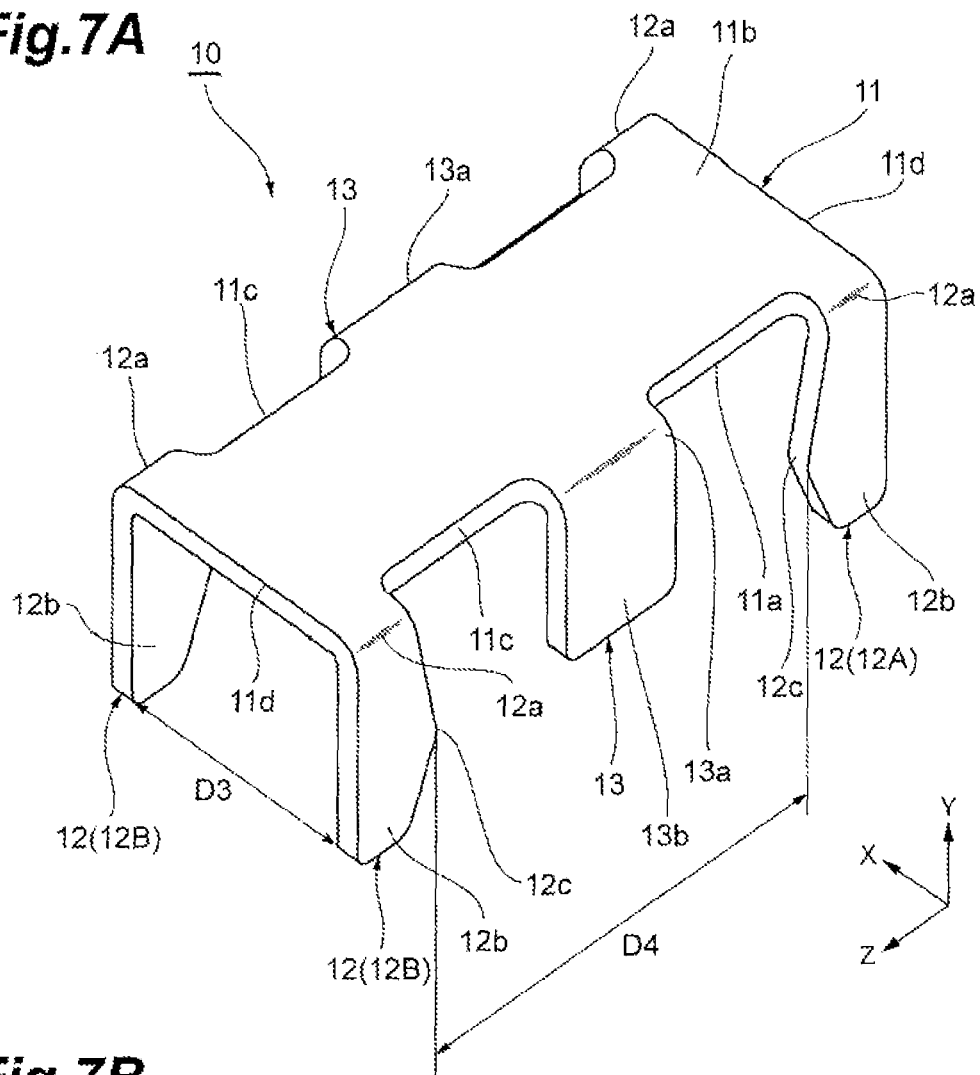
FIG. 7A is a perspective view of the clip member of the optical module in FIG. 1.
Figure 7B:
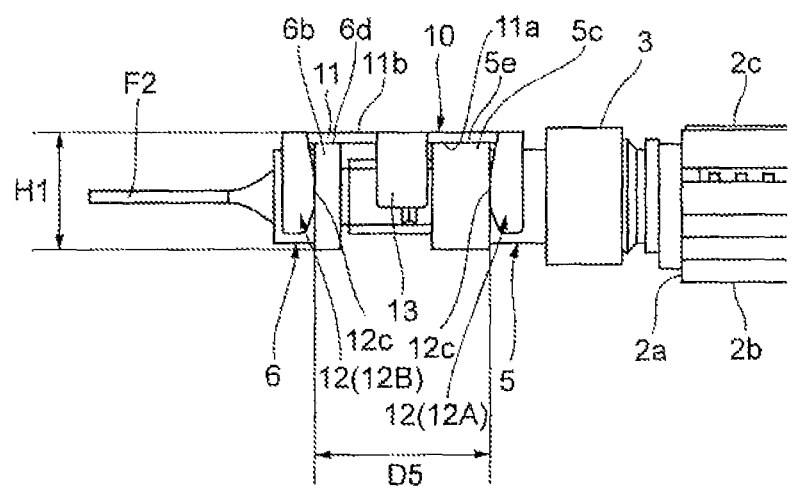
FIG. 7B is an enlarged side view of the area around the clip member of the optical module in FIG. 1.

FIG. 7A is a perspective view of the clip member 10. FIG. 7B is an enlarged side view of the configurations around the clip member 10. As shown in FIGS. 7A and 7B, the clip member 10 includes a plate-shaped part 11 having a flat contact surface 11a (a third flat surface) in contact with the flat surface 5e of the receptacle 5 and the flat surface 6d of the plug 6, retainers 12 extending from the plate-shaped part 11 outward from the surface of the plate-shaped part 11, and protruding parts 13 protruding from the plate-shaped part 11 outward from the surface of the plate-shaped part 11 between the plurality of retainers 12.

The plate-shaped part 11 is in a flat plate shape, for example. The plate-shaped part 11 has the above-described contact surface 11a and an outer surface 11b facing the opposite side of the contact surface 11a. The clip member 10 holds the receptacle 5 and the plug 6 with the contact surface 11a being in surface contact with the flat surface 5e and the flat surface 6d. That is, the contact surface 11a determines the parallelism of the flat surface 5e with the flat surface 6d. The contact surface 11a is in surface contact with the flat surface 5e and the flat surface 6d, and hence the clip member 10 adjusts the rotation angles of the receptacle 5 and the plug 6 about the optical fibers F1 and F2. Similarly to the contact surface 11a, the outer surface 11b is flat. The plate-shaped part 11 is rectangular extending in the Z-direction and in the X-direction, for example, having a pair of long sides 11c extending in the Z-direction and a pair of short sides 11d extending in the X-direction. At two ends of the long side 11c in the Z-direction, the retainer 12 bent in the Y-direction is provided. Note that the flat surface 5e and the flat surface 6d do not necessarily have to be in surface contact. That is, the rotation angles of the receptacle 5 and the plug 6 about the optical fibers F1 and F2 only have to be adjusted, and the parallelism of the flat surface 5e with the flat surface 6d only has to be determined. Note that on this parallelism, the displacement between the rotation angles only has to fall in the range of ±5°. For example, parallelism can be maintained when the distances from the contact surface 11a to the flat surface 5e and to the flat surface 6d are 10 μm or less.

The clip member 10 includes the plurality of retainers 12. The plurality of retainers 12 is provided one each at four corners of the plate-shaped part 11, for example, and a distance D3 between a pair of retainers 12 arranged along the X-direction is the same as the outer diameter of the cylindrical part 5d and the outer diameter of the cylindrical part 6c, for example. The retainer 12 includes a curved surface 12a curved from the plate-shaped part 11 and a plate-shaped part 12b extending from the curved surface 12a in the Y-direction. The plate-shaped part 12b is in a flat plate shape, for example. The plate-shaped part 12b has a protrusion 12c protruding on the inner side of the clip member 10 in the Z-direction. The clip member 10 is formed of a material including stainless steel or a material including copper. Since both of a material including stainless steel and a material including copper are of a high rigidity, a high spring force can be achieved with a thin plate. Note that the clip member 10 may be a material made of a resin. A material made of a resin can achieve a high spring force.

The protrusion 12c protrudes in a V-shape at the plate-shaped part 12b, for example. However, the shape of the protrusion 12c can be appropriately changed. The protrusion 12c is the portion that contacts the flange 5c of the receptacle 5 or the flange 6b of the plug 6. A plurality of protrusions 12c presses the flange 5c and the flange 6b in the joining direction where the flange 5c is joined to the flange 6b (on the center side of the Z-axis of the clip member 10 in the direction where the receptacle 5 is brought close to the plug 6). The clip member 10 presses the receptacle 5 and the plug 6 to each other. Thus, the retainer 12 has the protrusion 12c, the clip member 10 presses the receptacle 5 and the plug 6 to each other, and hence a strong connection of the receptacle 5 to the plug 6 is achieved. The retainer 12 includes a first retainer 12A that presses the receptacle 5 against the plug 6 and a second retainer 12B that presses the plug 6 against the receptacle 5. The distance between the protrusions 12c of two retainers 12 opposite to each other is shown as a distance D4.

From the centers of the long sides 11c in the Z-direction, the protruding part 13 bent in the Y-direction is provided. The clip member 10 includes a pair of protruding parts 13 disposed along the X-direction. The protruding parts 13 are provided between the pair of retainers 12 arranged along the Z-direction. The protruding part 13 includes a curved portion 13a curved from the plate-shaped part 11 and a plate-shaped part 13b extending from the curved portion 13a in the Y-direction. Between a pair of plate-shaped part 13b, the sleeve 5b of the receptacle 5 is present. The clip member 10 can be installed between the receptacle 5 and the plug 6 without the sleeve 5b contacting with the flange 6b because of the presence of the protruding part 13.

In the following, the operation and the effect obtained from the optical connector and the optical module 1 according to the embodiment will be described in detail. In the optical connector according to the embodiment, the receptacle 5 has the flat surfaces 5e, and the plug 6 that is the optical fiber holding member has the flat surfaces 6d. The clip member 10 has the contact surface 11a that contacts the flat surface 5e and the flat surface 6d. The clip member 10 has the first retainer 12A and the second retainer 12B that hold the state in which the plug 6 is joined to the receptacle 5 with the parallelism of the flat surface 5e with the flat surface 6d determined by the contact surface 11a. The first retainers 12A press the receptacle 5 against the plug 6, and the second retainers 12B press the plug 6 against the receptacle 5. Thus, the first retainer 12A and the second retainer 12B of the clip member 10 hold the plug 6 and the receptacle 5, and hence the plug 6 and the receptacle 5 can be held with a simple configuration.

The first retainer 12A and the second retainer 12B respectively press the receptacle 5 and the plug 6 with the parallelism of the flat surface 5e with the flat surface 6d determined by the contact surface 11a, and hence the receptacle 5 and the plug 6 can be reliably held by the clip member 10 in a small size. The parallelism of the flat surface 5e with the flat surface 6d is determined, and hence this stops the clip member 10, the receptacle 5, and the plug 6 from coming out of the housing 2. Thus, the clip member 10, the receptacle 5, and the plug 6 can be reliably accommodated in the inside of the optical transceiver. Consequently, the optical module 1 can also be reliably mounted in a limited space, such as the inside of the optical transceiver.

The optical fiber F2 held on the plug 6 is a PMF, and the optical fiber F2 has a slow axis or the fast axis each parallel with the contact surface 11a. Therefore, since the optical fiber F2 held on the plug 6 is a polarization maintaining fiber, the clip member 10 joins the plug 6 to the receptacle 5, and holds the plug 6 and the receptacle 5, and hence optical signals can be outputted from the plug 6 in a correct polarized state.

The optical fiber F1 held on the receptacle 5 is a PMF. the optical fiber F1 has a slow axis or the fast axis each parallel with the contact surface 11a. In this case, since the optical fiber F1 held on the receptacle 5 is a polarization maintaining fiber, the polarization maintaining fiber is used on the receptacle 5, and hence the polarization characteristics can be further improved. The clip member 10 is mounted (inserted) to surface-contact the contact surface 11a of the clip member 10 with the flat surface 5e and the flat surface 6d. Thus, a slight positional displacement in the rotation direction in connecting the stub of the receptacle 5 to the stub of the plug 6 can be corrected, and the polarization directions of the polarization maintaining fibers can be aligned. As described above, the contact surface 11a of the clip member 10 is surface-contacted with the flat surface 5e and the flat surface 6d, and hence the flat surface 5e and the flat surface 6d can be followed.

The clip member 10 has two retainers 12 facing each other along the joining direction where the plug 6 is joined to the receptacle 5. The retainers 12 press the flange 5c against the flange 6b in the joining direction. Therefore, the retainers 12 press the receptacle 5 against the plug 6 along the joining direction, and hence the receptacle 5 can be more firmly joined to the plug 6.

The retainer 12 has the protrusion 12c that presses any one of the flange 5c and the flange 6b. Therefore, the flange 5c and the flange 6b are pressed by the protrusion 12c, and hence the pressure to the flange 5c and the flange 6b can be further improved. Thus, the plug 6 and the receptacle 5 that are joined to each other can be more firmly held.

FIG. 7B is a view of a coupling part where the clip member 10 is joined to the plug 6 and the receptacle 5 shown in FIG. 3. The distance between the contact surface of the flange 5c and the contact surface of the flange 6b each in contact with the retainer 12 is shown as a distance D5. In the state in which before the clip member 10 is mounted on the flange 5c and the flange 6b, the distance D4 between two retainers 12 facing each other is shorter than the distance D5 between the contact surface of the flange 5c and the contact surface of the flange 6b each in contact with the retainer 12. Thus, the pair of retainers 12 press the flange 5c against the flange 6b that are entered between the pair of retainers 12. Therefore, the flange 5c and the flange 6b are pressed by the retainers 12, and hence the pressure to the flange 5c and the flange 6b can be further improved.

As shown in FIG. 1, the clip member 10 has the plurality of retainers 12 arranged in the joining direction where the plug 6 is joined to the receptacle 5 (in the Z-direction) and facing each other to the crossing direction (the X-direction) crossing the joining direction. The plurality of retainers 12 presses a pair of portions of the flange 5c facing to each other in the X-direction and a pair of portions of the flange 6b facing in the X-direction. Therefore, the flange 5c and the flange 6b can be pressed from two directions, the Z-direction and in the X-direction, and hence the pressure to the flange 5c and the flange 6b can be further improved. Thus, the plug 6 and the receptacle 5 that are joined to each other can be more firmly held.

The flange 5c and the flange 6b are made of a material including stainless steel. Stainless steel materials are of high durability and of excellence in environmental resistance performance, such as high temperature and high humidity. Thus, the durability and environmental resistance performance of the flange 5c and the flange 6b can be improved.

In the above-described optical connector, the optical module 1 according to the embodiment further includes the housing 2 having a window on which the receptacle 5 is provided, the housing 2 mounting an optical element. The housing 2 has a bottom face 2b. The optical element processes light having a plane of polarization parallel with or vertical to the bottom face 2b. The contact surface 11a is in parallel with the bottom face 2b. In the optical module 1, the housing 2 has a top face 2c opposite to the bottom face 2b of the housing 2. The contact surface 11a is located between the bottom face 2b and the top face 2c. The length (e.g. the distance between the pair of flat surfaces 5e) from the flat surface 5e to the edge of the opposite flat surface 5e of the flange 5c of the receptacle 5 and the length (e.g. the distance between the pair of flat surfaces 6d) from the flat surface 6d to the edge of the opposite flat surface 6d of the flange 6b of the plug 6 are shorter than the length of the bottom face 2b to the top face 2c of the housing 2. Thus, the clip member 10, the plug 6, and the receptacle 5 can be made more compact, and hence the optical module 1 can be more reliably mounted in a limited space, such as the internal space of an optical transceiver.

Second Embodiment

Figure 8:
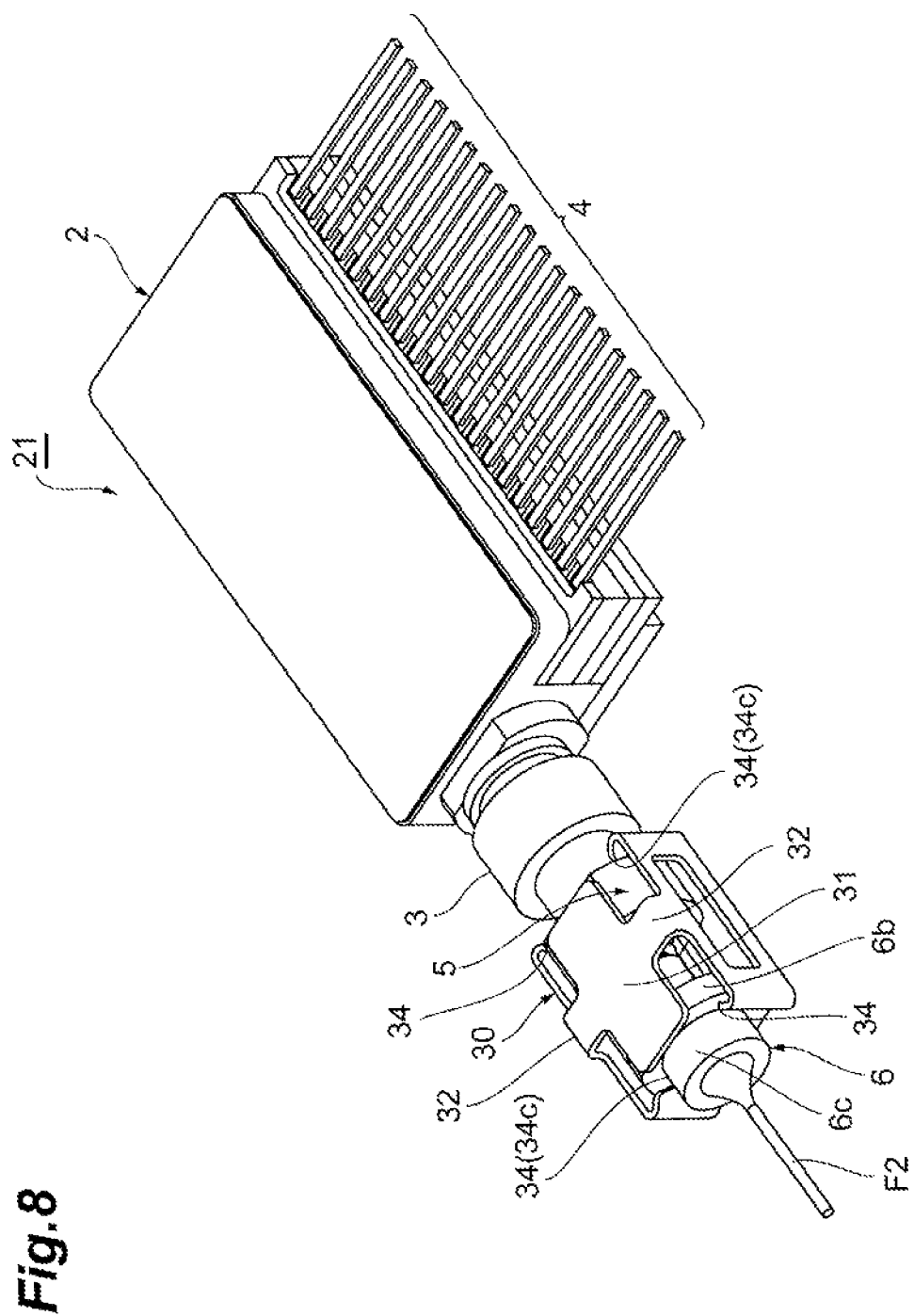
FIG. 8 is a perspective view of an optical module according to a second embodiment.
Figure 9:
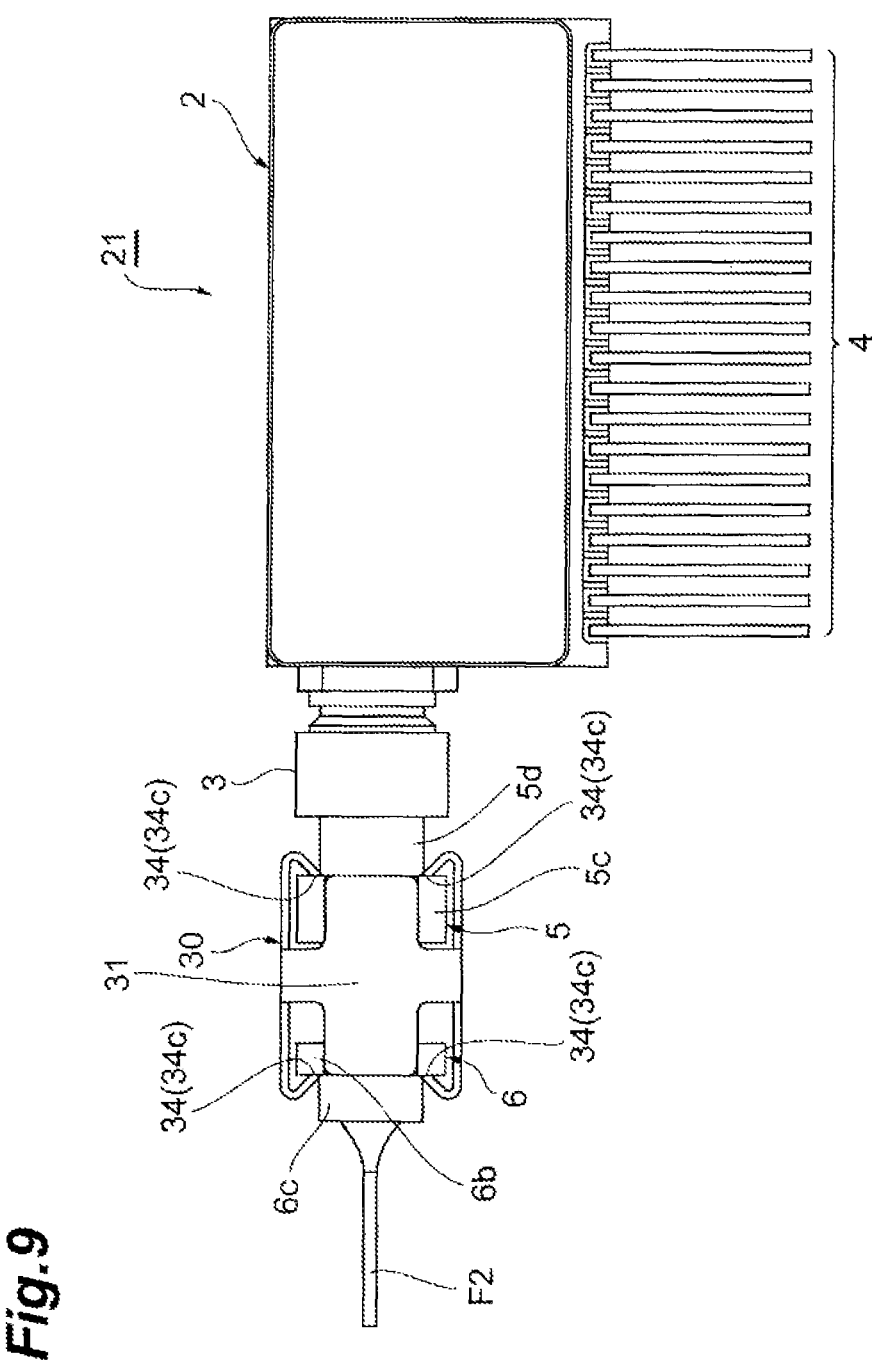
FIG. 9 is a plan view of the optical module in FIG. 8.

Next, an optical module 21 according to a second embodiment will be described with reference to FIGS. 8 to 11. FIG. 8 is a perspective view of an optical module 21. FIG. 9 is a plan view of the optical module 21. As shown in FIGS. 8 and 9, the optical module 21 includes a housing 2, an optical fiber introduction part 3, a terminal 4, a receptacle 5, and a plug 6, which are similar to those described above. The optical module 21 further includes a clip member 30 different from the above-described clip member 10. This point is different from the first embodiment. In the following, the duplicate description of the first embodiment will be appropriately omitted.

Figure 10:
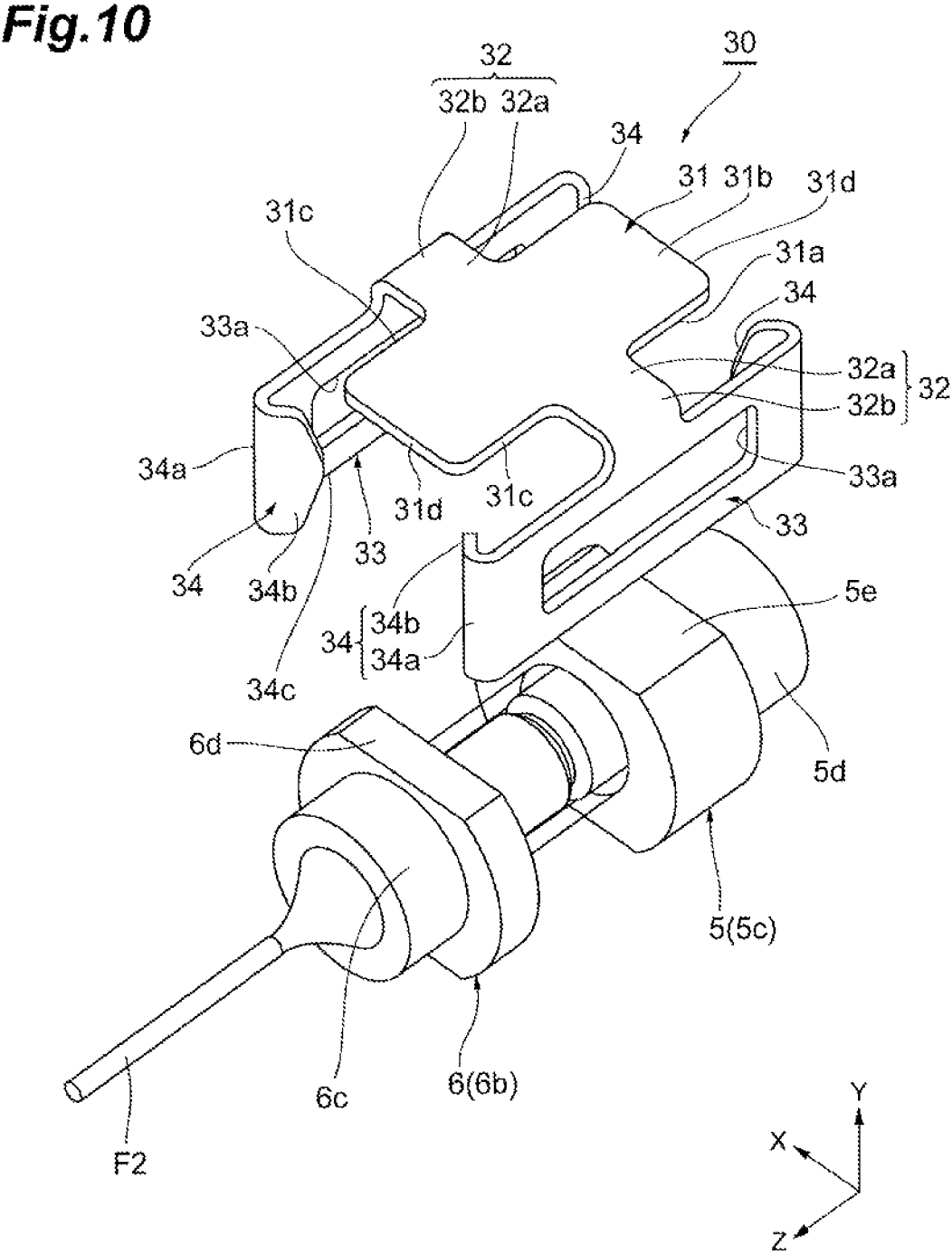
FIG. 10 is a perspective view of the receptacle, the optical fiber holding member, and the clip member of the optical module in FIG. 8.

FIG. 10 is a perspective view of the clip member 30, the receptacle 5, and the plug 6. As shown in FIG. 10, the clip member 30 includes a first plate-shaped part 31 having a flat contact surface 31a that contacts a flat surface 5e of the receptacle 5 and a flat surface 6d of the plug 6, protruding parts 32 protruding from the first plate-shaped part 31 in the X-direction, a second plate-shaped part 33 extending in the Y-direction and the Z-direction from the protruding parts 32 on the opposite side of the first plate-shaped part 31, and retainers 34 individually provided at the end portions of the second plate-shaped parts 33 in the Z-direction.

Figure 11:
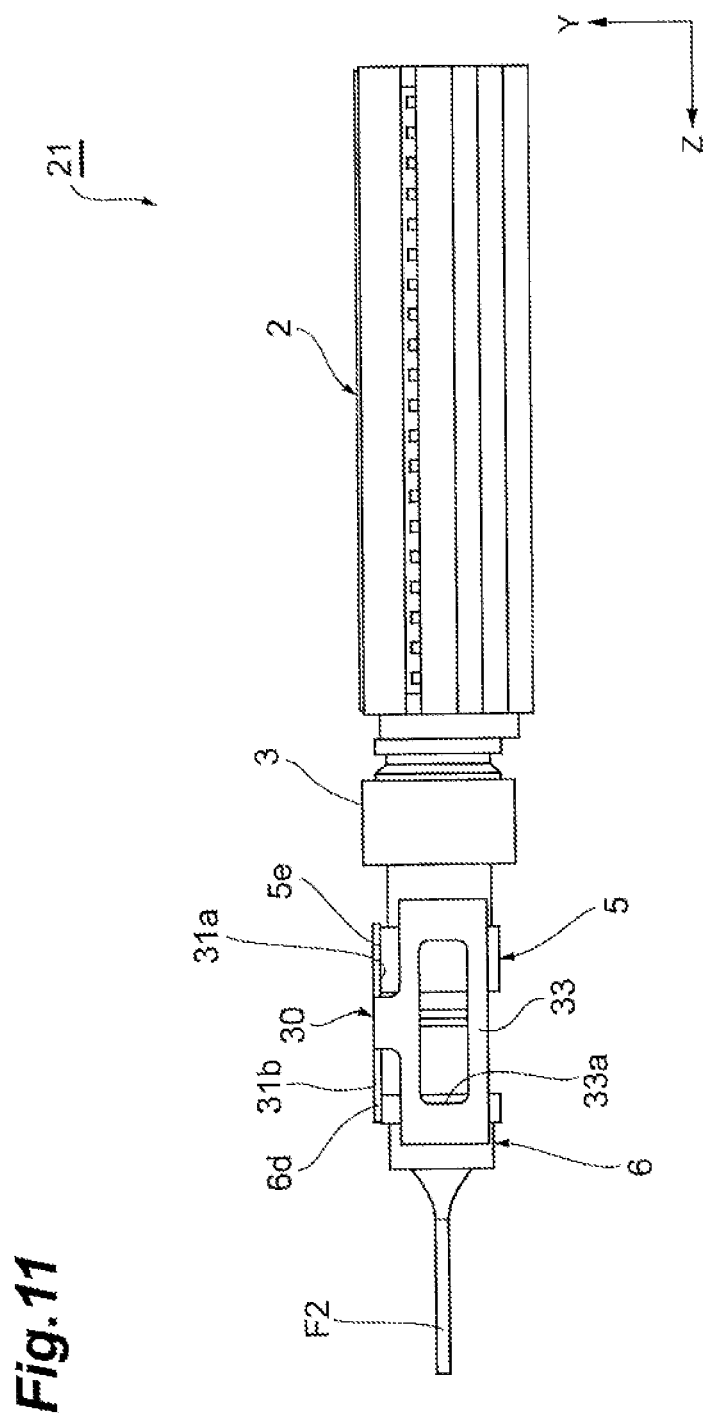
FIG. 11 is a side view of the optical module in FIG. 8.

FIG. 11 is a side view of the clip member 30, the receptacle 5, and the plug 6. As shown in FIGS. 10 and 11, the first plate-shaped part 31 has the above-described contact surface 31a and an outer surface 31b directed to the opposite side of the contact surface 31a. For example, the contact surface 31a and the outer surface 31b are both flat. The first plate-shaped part 31 has a pair of long sides 31c extending in the Z-direction and a pair of short sides 31d extending in the X-direction. From the center parts of the long sides 31c in the Z-direction, the protruding part 32 protrudes in the X-direction.

The protruding parts 32 each have a flat portion 32a extending from the first plate-shaped part 31 in the X-direction and a curved portion 32b curved from the flat portion 32a in the Y-direction on the opposite side of the first plate-shaped part 31. The second plate-shaped part 33 extends in a flat plate shape from the end portion of the curved portion 32b in the Y-direction. The shape of the second plate-shaped part 33 is in a rectangular frame shape. The second plate-shaped part 33 has a through hole 33a penetrating the second plate-shaped part 33 in the X-direction. The through hole 33a is in a rectangular shape extending in the Z-direction and the Y-direction.

The retainer 34 is provided on each of the end portions of the second plate-shaped parts 33 in the Z-direction. The retainers 34 has a curved portion 34a curved from the end portion of the second plate-shaped part 33 in the Z-direction to the inner side of the clip member 30 in the X-direction and a flat portion 34b protruding to the inner side of the clip member 30 from the curved portion 34a on the opposite side of the second plate-shaped part 33. The flat portions 34b obliquely extend on the inner side of the clip member 30 in the X-direction and the Z-direction (to the center of the clip member 30 on the ZX plane). At the end portion of the flat portions 34b on the opposite side of the curved portion 34a, a protrusion 34c obliquely protruding on the inner side in the X-direction and the Z-direction is provided.

Similarly to the above-described protrusion 12c, for example, the protrusion 34c protrudes in a V-shape. However, the shape of the protrusion 34c can be appropriately changed. As shown in FIGS. 8 and 9, the protrusion 34c of the retainer 34 is a portion protruding between the flange 5c and the cylindrical part 5d, or between the flange 6b and the cylindrical part 6c. The protrusions 34c press the flange 5c and the flange 6b in the joining direction where the flange 5c and the flange 6b are joined to each other. Thus, the retainer 34 has the protrusions 34c, and hence a strong connection of the receptacle 5 to the plug 6 is achieved.

In the optical module 21 according to the second embodiment, the clip member 30 has the contact surface 31a that determines the parallelism of the flat surface 5e with the flat surface 6d, and holds the state in which the plug 6 is joined to the receptacle 5 with the contact surface 31a determining the parallelism of the flat surface 5e with the flat surface 6d. The retainers 34 of the clip member 30 hold the plug 6 and the receptacle 5 in the joining direction, and hence the plug 6 and the receptacle 5 can be held with a simple configuration. Consequently, the optical module 21 obtains the operation and effect similar to the optical module 1 according to the first embodiment.

Third Embodiment

Figure 12:
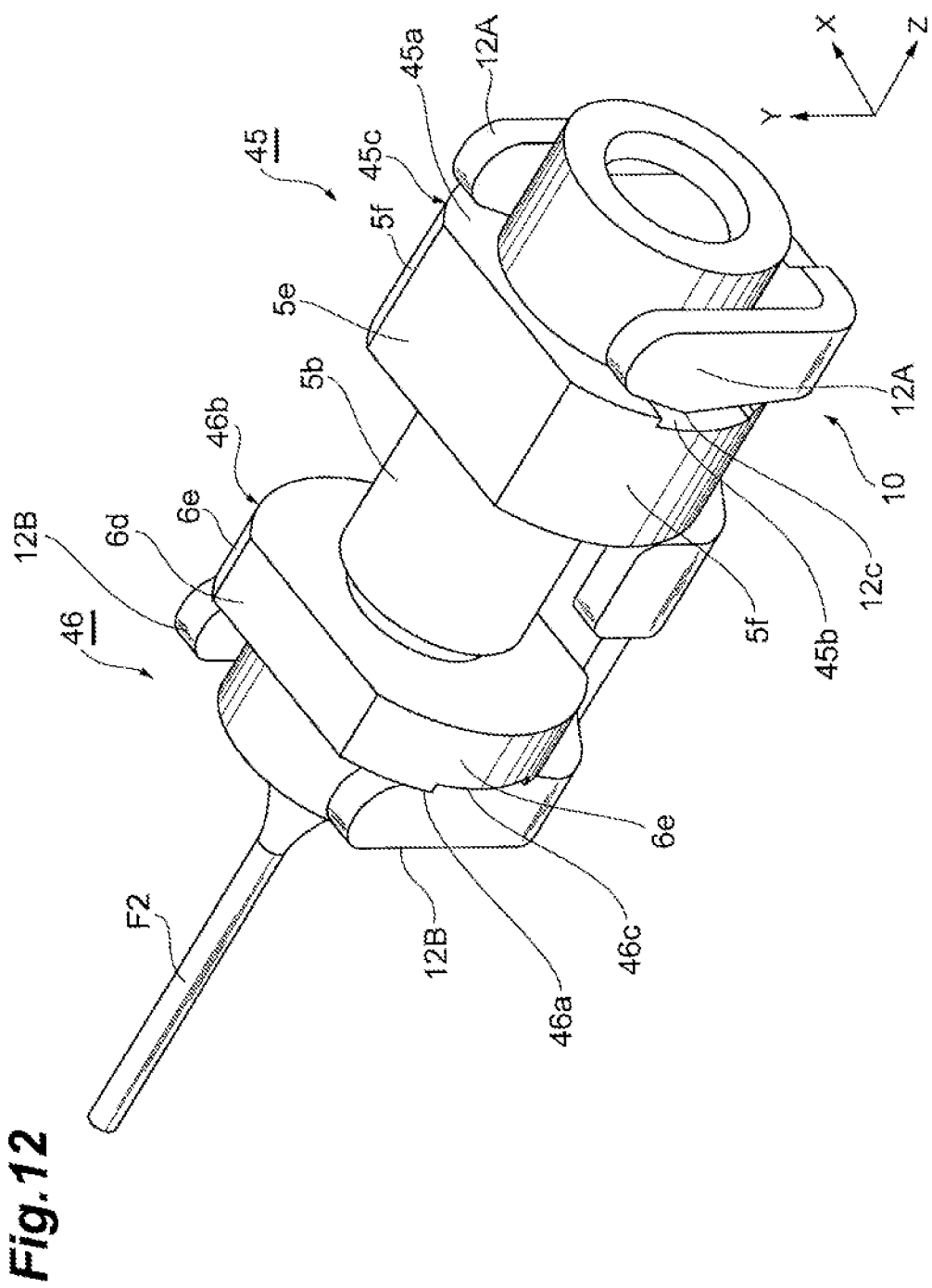
FIG. 12 is a perspective view of the receptacle, the optical fiber holding member, and the clip member of an optical module according to a third embodiment.
Figure 13:
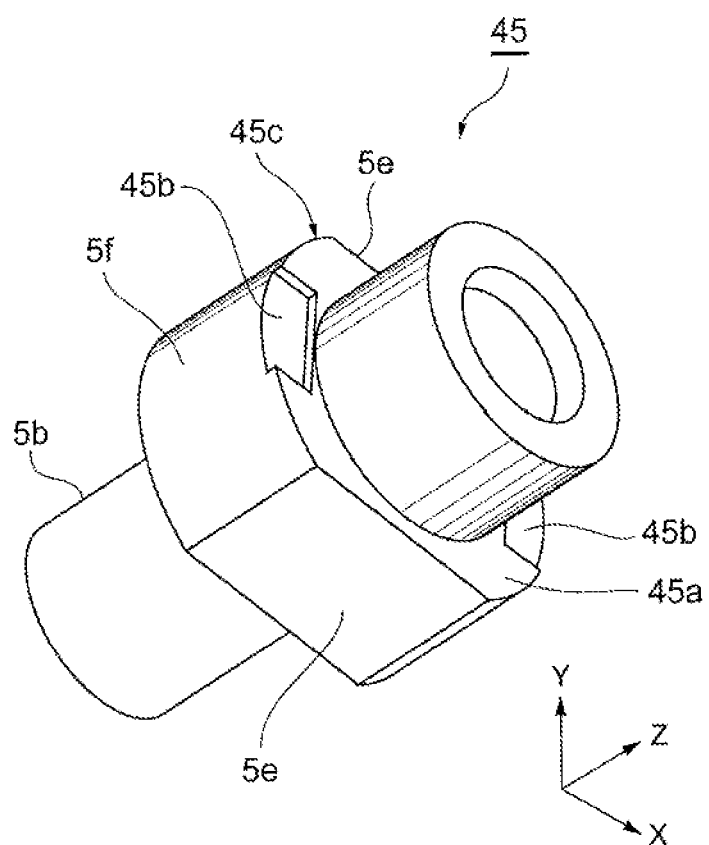
FIG. 13 is a perspective view of the receptacle shown in FIG. 12.

Next, an optical module according to a third embodiment will be described with reference to FIGS. 12 to 16. FIG. 12 is a perspective view of a receptacle 45, a plug 46 (an optical fiber holding member), and a clip member 10 of the optical module according to the third embodiment. FIG. 13 is a perspective view of a receptacle 45.

As shown in FIGS. 12 and 13, the receptacle 45 has a flange 45c increased in diameter to a sleeve 5b. The outer surface of the flange 45c includes a pair of flat surfaces 5e directed to the Y-direction, a pair of curved surfaces 5f curved in an arc shape between the pair of flat surfaces 5e, and an opposed surface 45a to which a first retainer 12A of the clip member 10. On the opposed surface 45a, a first recess 45b into which a protrusion 12c of the first retainer 12A is entered is formed. The opposed surface 45a is flat, for example, directed to the Z-direction. The first recess 45b is formed at two ends of the opposed surface 45a in the X-direction, for example, making a pair. The pair of first recesses 45b are recessed in the Z-direction at two ends of the opposed surface 45a in the X-direction. The shapes of the first recesses 45b are rectangular extending in the Y-direction, for example.

Figure 14:
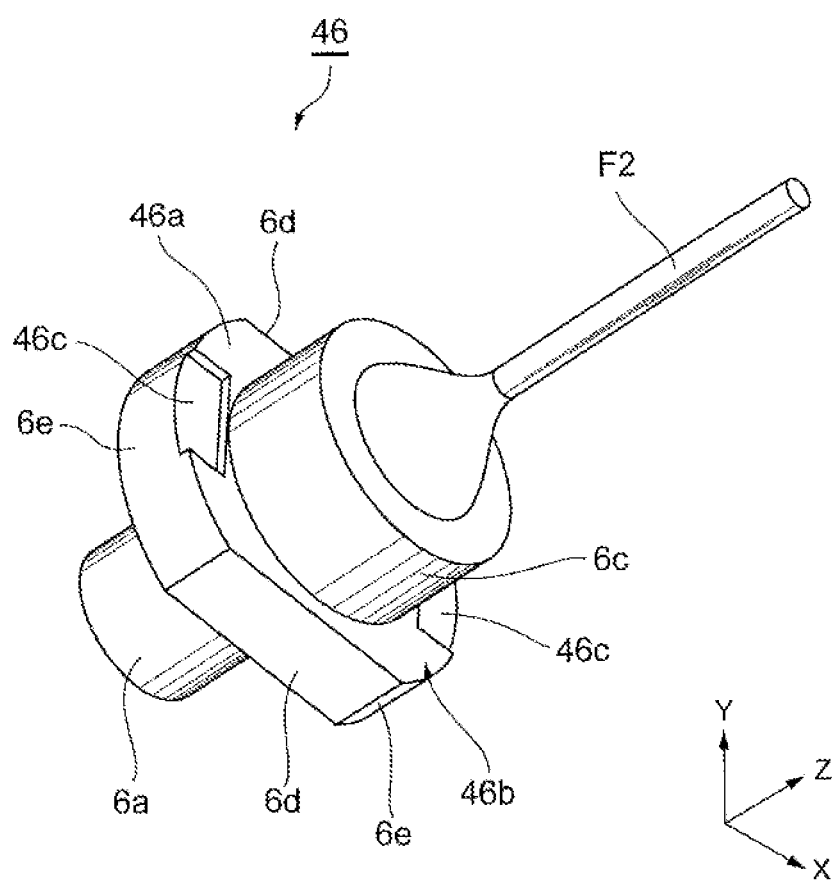
FIG. 14 is a perspective view of the optical fiber holding member in FIG. 12.

FIG. 14 is a perspective view of the plug 46. As shown in FIGS. 12 and 14, the plug 46 has a stub 6a that holds an optical fiber F2 and a flange 46b increased in diameter from the cylindrical part 6c. The outer surface of the flange 46b includes a pair of flat surfaces 6d directed to the Y-direction, a pair of curved surfaces 6e curved in an arc shape between the pair of flat surfaces 6d, and an opposed surface 46a opposed to a second retainer 12B of the clip member 10. On the opposed surface 46a, a second recess 46c into which the protrusion 12c of the second retainer 12B is entered is formed.

For example, at least any one of the shapes and sizes of the opposed surface 46a and the second recess 46c may be the same as at least any one of the shapes and sizes of the opposed surface 45a and the first recess 45b. That is, the opposed surface 46a is directed to the Z-direction, for example, and flat. The second recess 46c may be formed at two ends of the opposed surface 46a in the X-direction, making a pair. The pair of the second recesses 46c may be recessed from the opposed surface 46a in the Z-direction. The shapes of the second recesses 46c may be rectangular extending in the Y-direction.

As described above, in the optical module according to the third embodiment, the receptacle 45 has the first recess 45b into which the protrusion 12c of the first retainer 12A is entered. The plug 46 has the second recess 46c into which the protrusion 12c of the second retainer 12B is entered. Thus, the protrusion 12c individually press the receptacle 45 and the plug 46, and hence the plug 46 and the receptacle 45 that are joined to each other can be firmly held.

Figure 15:
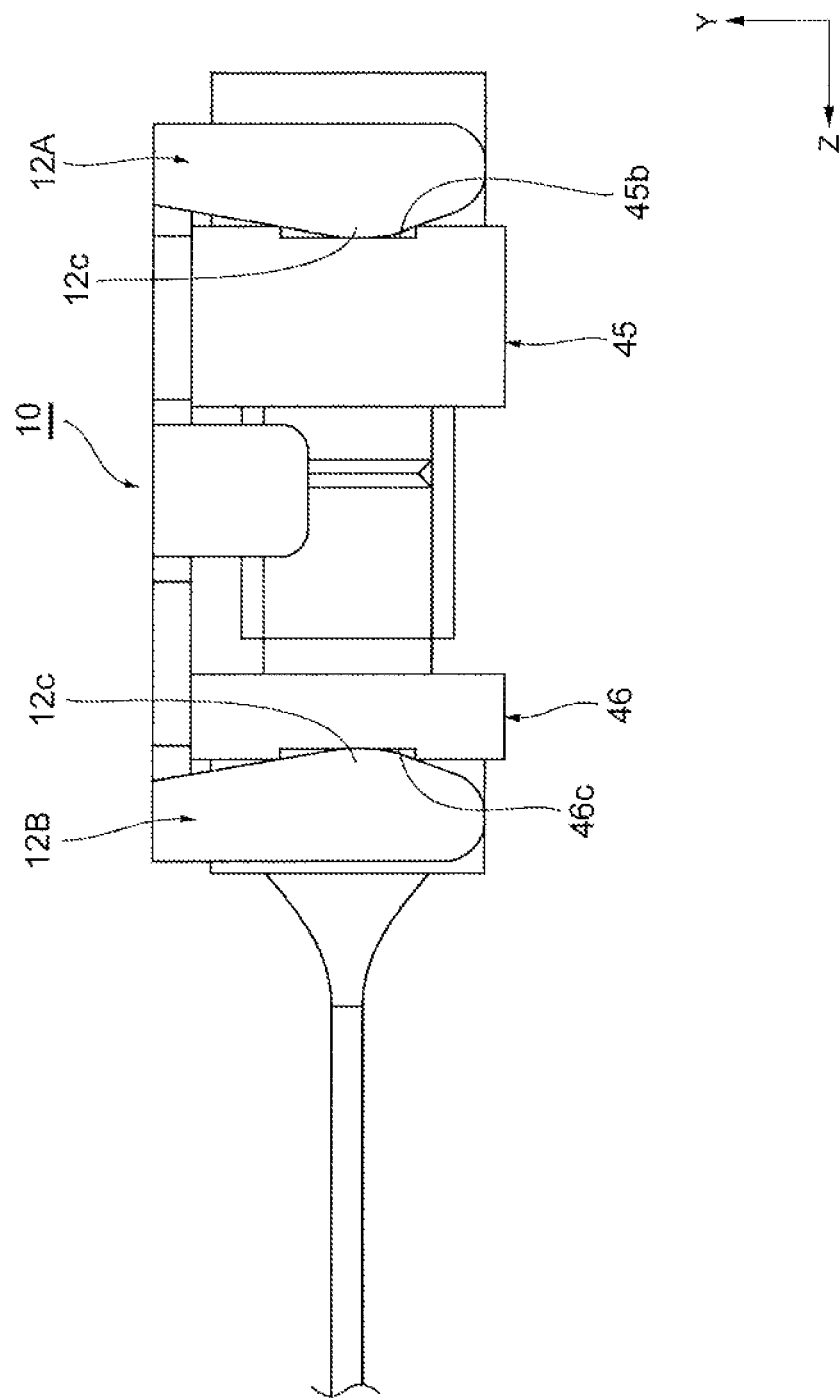
FIG. 15 is a side view of the receptacle, the optical fiber holding member, and the clip member in FIG. 12.
Figure 16:
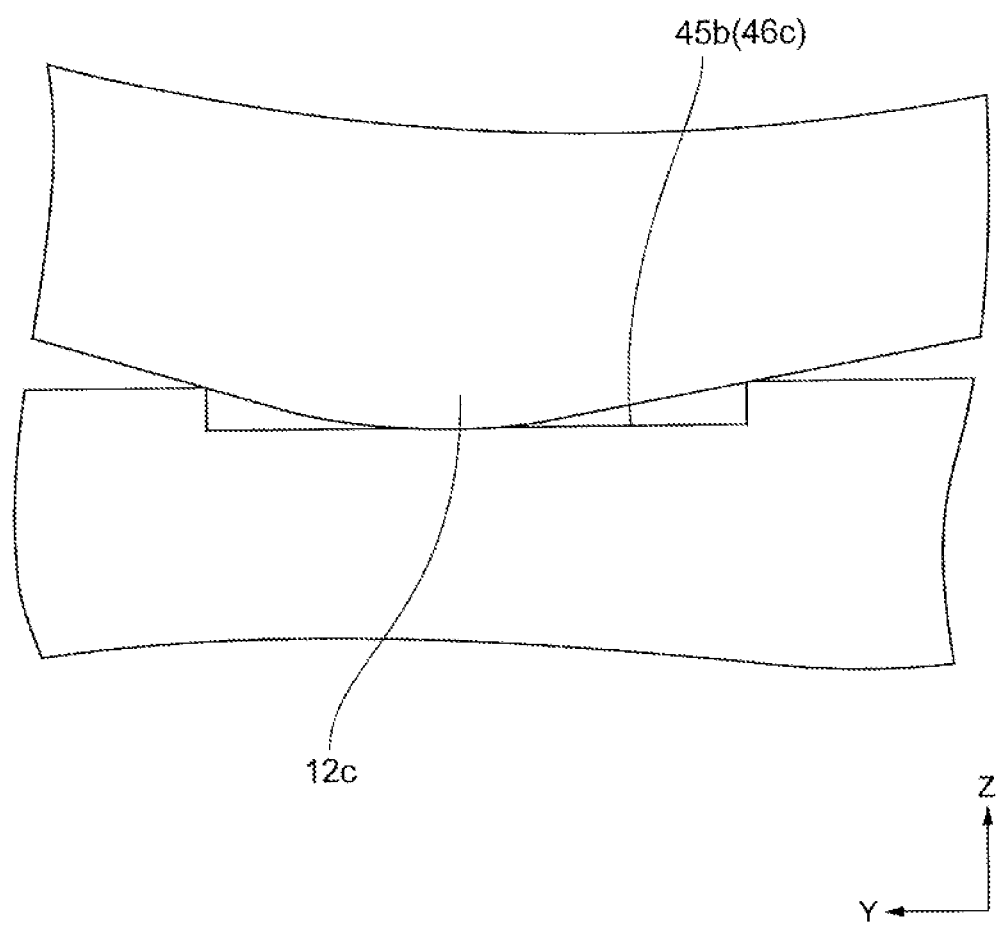
FIG. 16 is an enlarged view of the recess of the receptacle or the optical fiber holding member and the protrusion of the clip member in FIG. 15.

FIG. 15 is a side view of the receptacle 45, the plug 46, and the clip member 10. FIG. 16 is an enlarged view of the protrusion 12c of the first retainer 12A (the second retainer 12B) and the first recess 45b (the second recess 46c) in FIG. 15. Since the receptacle 45 has the first recess 45b, and the plug 46 has the second recess 46c, the protrusion 12c are individually entered into the first recess 45b and the second recess 46c. Thus, the possibility that the first retainer 12A and the second retainer 12B respectively come off from the receptacle 45 and the plug 46 can be more reduced. That is, even in the case in which vibrations, for example, are applied, the protrusion 12c respectively contact the inner surface of the first recess 45b and the inner surface of the second recess 46c, and the first retainer 12A and the second retainer 12B can hardly come off from the receptacle 45 and the plug 46, respectively.

Specifically, in the optical transceiver on which the optical module is mounted, it is requested to keep the joining and fitting states of the components in both of vibration tests, impact tests, and any other tests. For example, there are sometimes requests that no optical output is varied when vibrations and an impact are applied (for example, a variation of 0.5 dB or more is not observed). In the optical module according to the third embodiment, also in vibration tests, impact tests, and any other tests like the above tests, the first retainer 12A and the second retainer 12B can hardly come off from the receptacle 45 and the plug 46, respectively, and hence the fitting of the clip member 10 can be kept in vibration tests, impact tests, and any other tests. Note that in the third embodiment, an example is described in which the receptacle 45 has the first recesses 45b, and the plug 46 has the second recesses 46c. However, the receptacle alone may have the first recess (the plug may have no second recess), or the plug alone may have the second recess (the receptacle may have no first recess).

Fourth Embodiment

Figure 17:
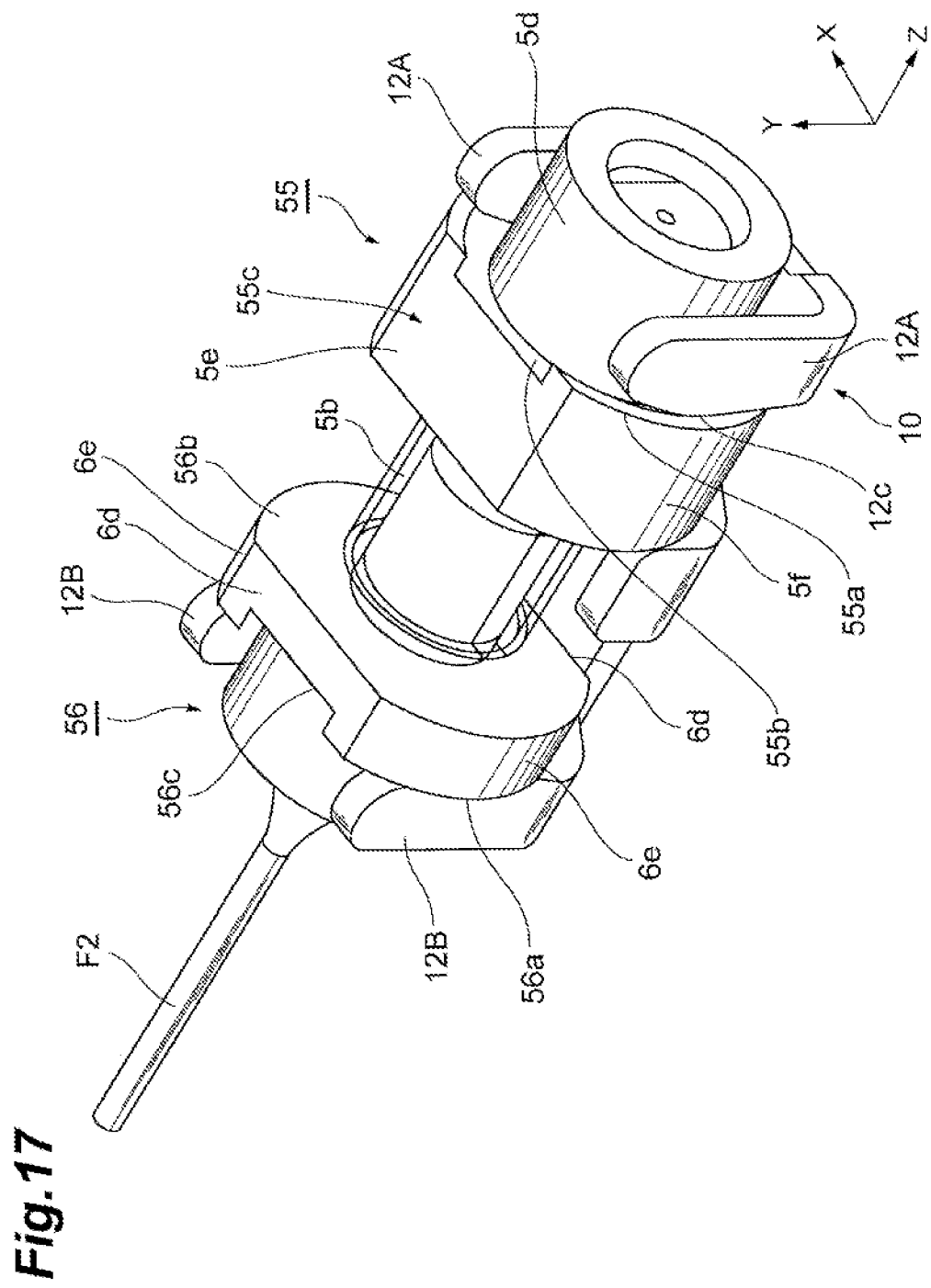
FIG. 17 is a perspective view of the receptacle, the optical fiber holding member, and the clip member of an optical module according to a fourth embodiment.
Figure 18:
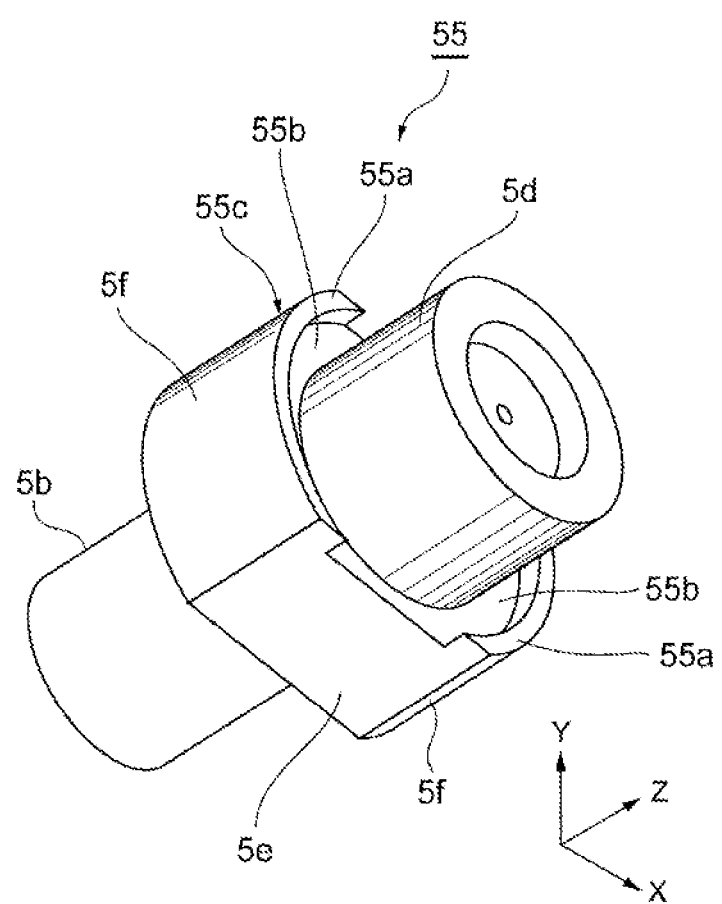
FIG. 18 is a perspective view of the receptacle in FIG. 17.

Next, an optical module according to a fourth embodiment will be described with reference to FIGS. 17 to 19. FIG. 17 is a perspective view of a receptacle 55, a plug 56 (an optical fiber holding member), and a clip member 10 of the optical module according to the fourth embodiment. FIG. 18 is a perspective view of the receptacle 55.

As shown in FIGS. 17 and 18, the receptacle 55 has a flange 55c increased in diameter to the sleeve 5b and the cylindrical part 5d. The outer surface of the flange 55c includes a pair of flat surfaces 5e directed to the Y-direction, a pair of curved surfaces 5f curved in an arc shape between the pair of flat surfaces 5e, and a protrusion 55a opposed to a first retainer 12A of the clip member 10. The protrusion 55a is directed to the Z-direction. On the inner side of the protrusion 55a in the X-direction, a first recess 55b into which the protrusion 12c of the first retainer 12A is entered is formed.

The first recess 55b is formed on the inner side of the protrusion 55a in the X-direction, for example, making a pair. The pair of first recesses 55b are recessed in the Z-direction on the inner side of the protrusion 55a in the X-direction. The first recess 55b is formed between the inner surface of the protrusion 55a and the outer surface of the cylindrical part 5d, and is in a groove shape extending along the circumferential direction of the flange 55c, for example. The first recess 55b is in an arc shape, for example.

Figure 19:
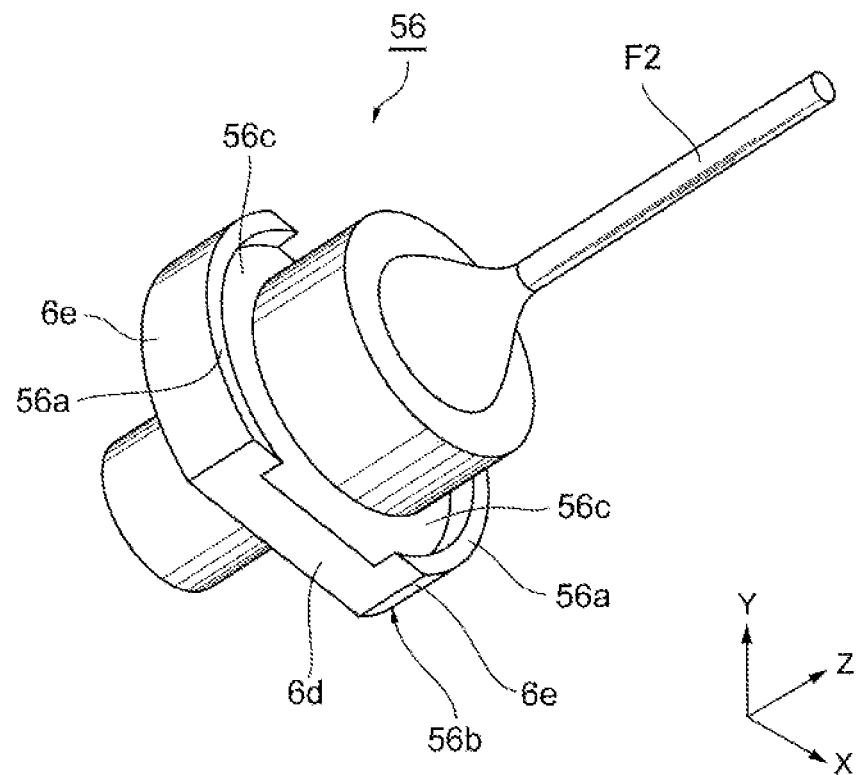
FIG. 19 is a perspective view of the optical fiber holding member in FIG. 17.

FIG. 19 is a perspective view of the plug 56. As shown in FIGS. 17 and 19, the plug 56 has a flange 56b. The outer surface of the flange 56b includes a pair of flat surfaces 6d directed to the Y-direction, a pair of curved surfaces 6e curved in an arc shape between the pair of flat surfaces 6d, and a protrusion 56a opposed to the second retainer 12B of the clip member 10. On the inner side of the protrusion 56a in the X-direction, a second recess 56c into which the protrusion 12c of the second retainer 12B is entered is formed. For example, the shapes and sizes of the protrusion 56a and the second recess 56c may be the same as the shapes and sizes of the protrusion 55a and the first recess 55b. That is, the second recess 56c may be in a groove shape extending along the circumferential direction of the flange 56b or may be in an arc shape.

As described above, in the optical module according to the fourth embodiment, the receptacle 55 has the first recess 55b into which the protrusion 12c of the first retainer 12A is entered, and the plug 56 has the second recess 56c into which the protrusion 12c of the second retainer 12B is entered. Thus, the effect similar to the third embodiment is obtained. That is, the protrusions 12c are individually entered into the first recess 55b and the second recess 56c, and hence the possibility that the first retainer 12A and the second retainer 12B respectively come off from the receptacle 55 and the plug 56 can be reduced, and the first retainer 12A and the second retainer 12B can hardly come off.

In the fourth embodiment, the first recess 55b is in a shape cut along the circumference of the flange 55c, and hence the effect that can decrease the processing costs of the first recess 55b is obtained. Since the protrusion 56a is provided on the outer side of the first recess 55b, the protrusion 56a is a guide in inserting the clip member 10, and the insertion can be improved. The protrusion 56a is provided on the outer side, and hence this enables stopping the pair of first retainers 12A from opening. Similar things are applied to the second recess 56c of the flange 56b. Note that in the fourth embodiment, an example is described in which the receptacle 55 has the first recesses 55b, and the plug 56 has the second recesses 56c. However, the receptacle alone may have the first recess (the plug may have no second recess), or the plug alone may have the second recess (the receptacle may have no first recess).

Fifth Embodiment

Figure 20:
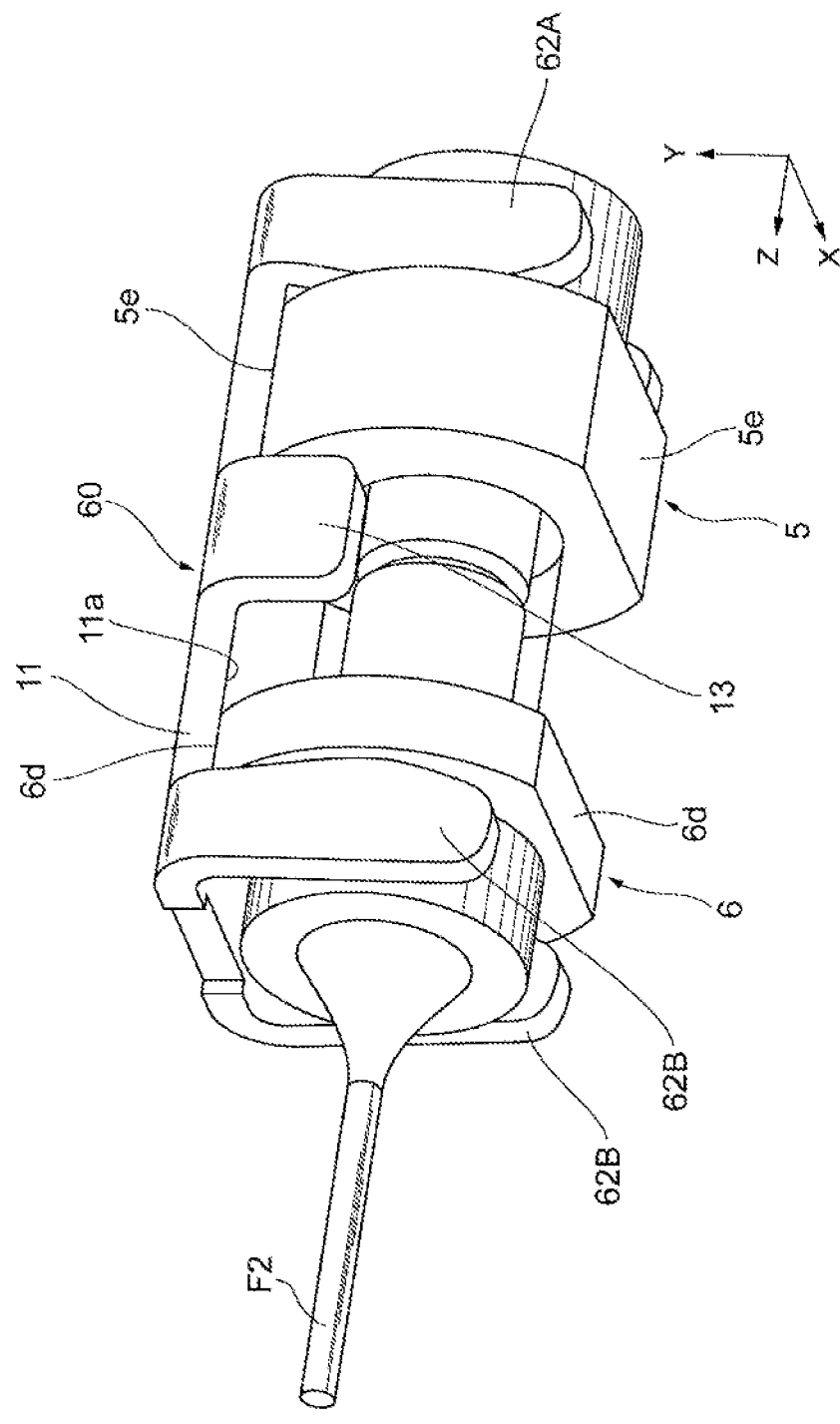
FIG. 20 is a perspective view of the receptacle, the optical fiber holding member, and the clip member of an optical module according to a fifth embodiment.

Next, an optical module according to a fifth embodiment will be described with reference to FIGS. 20 to 22. FIG. 20 is a perspective view of a receptacle 5, a plug 6, and a clip member 60. As shown in FIG. 20, similarly to the above-described clip member 10, the clip member 60 includes a plate-shaped part 11 having a contact surface 11a that contacts a flat surface 5e of the receptacle 5 and a flat surface 6d of the plug 6, a first retainer 62A and a second retainer 62B extending from the plate-shaped part 11 from the plate-shaped part 11, and a protruding part 13 protruding from the plate-shaped part 11, between the first retainer 62A and the second retainer 62B, outward from the surface of the plate-shaped part 11.

Figure 21:
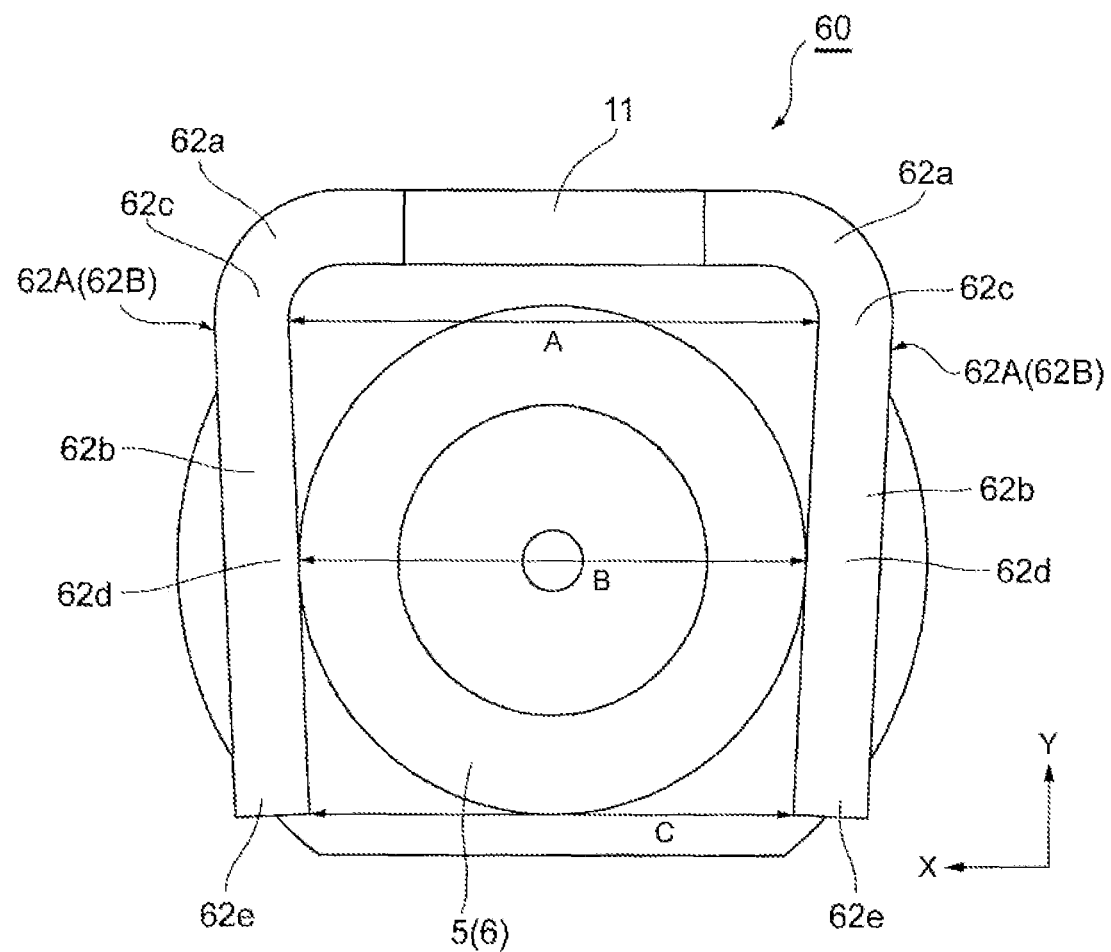
FIG. 21 is a front view of the retainer of the clip member in FIG. 20.
Figure 22:
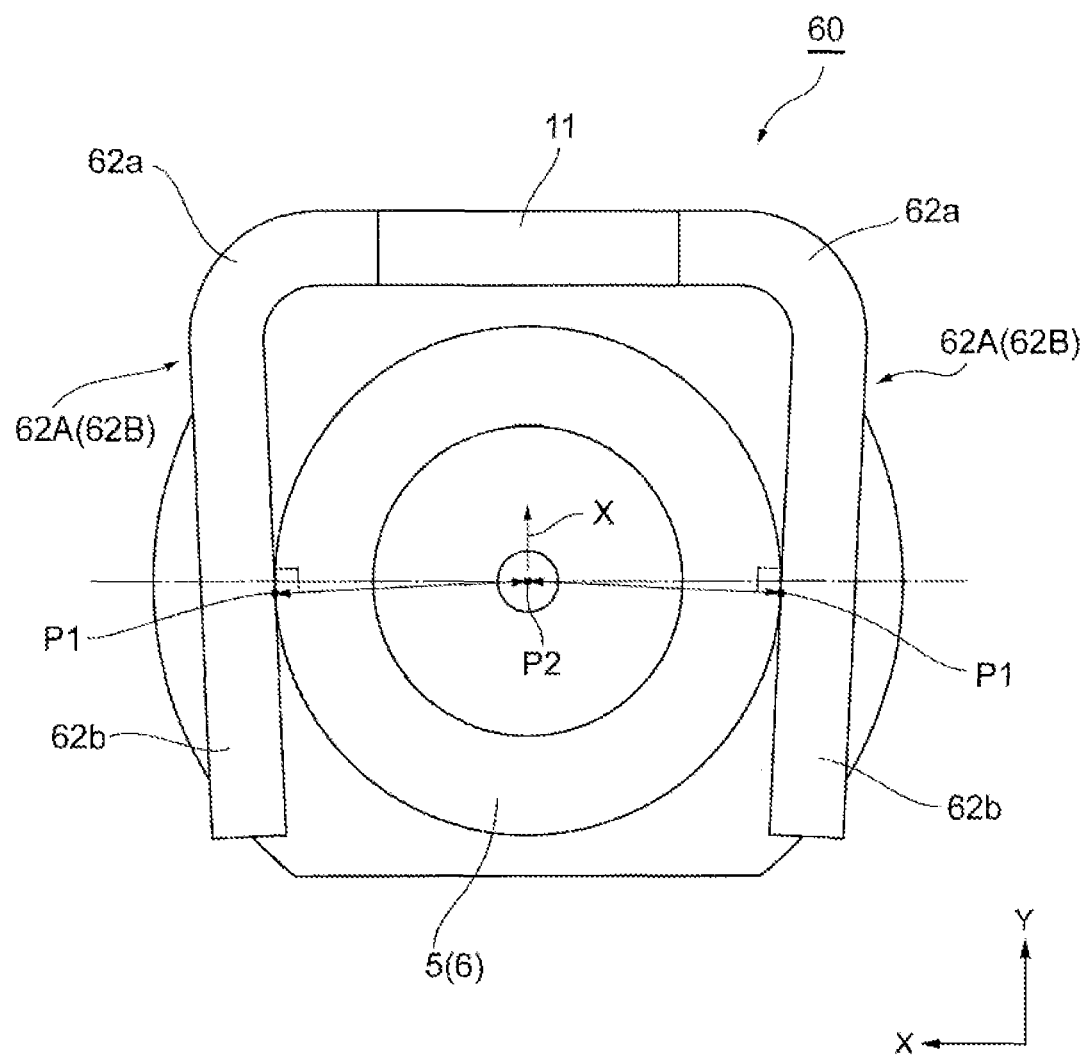
FIG. 22 is a front view of the retainer of the clip member in FIG. 20.

FIGS. 21 and 22 are front views of the first retainer 62A (the second retainer 62B) viewed from the Z-direction. The first retainers 62A in a pair and the second retainers 62B in a pair are provided along the X-direction. For example, the configuration of the first retainer 62A and the configuration of the second retainer 62B are the same. Therefore, in the following, the description of the second retainer 62B will be appropriately omitted. As shown in FIGS. 21 and 22, the pair of first retainers 62A each include a curved portion 62a curved from the plate-shaped part 11 and a plate-shaped part 62b extending from the curved portion 62a in the Y-direction. The plate-shaped parts 62b each have a root portion 62c continuous to the curved portion 62a, a center part 62d extending from the root portion 62c to the opposite side of the curved portion 62a, and a tip end portion 62e extending from the center part 62d and including the tip end of the plate-shaped part 62b.

The root portions 62c in a pair, the center parts 62d in a pair, and the tip end portions 62e in a pair are provided along the X-direction. The relation A>B>C is satisfied where the gap between the pair of root portions 62c is A, the pair of center parts 62d the gap between is B, and the gap between the pair of tip end portions 62e is C. That is, the gap between the root portions 62c is wider than the gap between the center parts 62d and the gap between the tip end portions 62e, and the gap between the tip end portions 62e is smaller than the gap between the center part 62d. Therefore, the pair of first retainers 62A are inclined in the direction in which the pair are brought close to each other as apart from the plate-shaped part 11. Similarly, the pair of second retainers 62B are also inclined in the direction in which the pair are brought close to each other as apart from the plate-shaped part 11. As an example, the gap A between the pair of root portions 62c A is 2.20 mm, the gap B between the pair of center parts 62d is 2.05 mm, the gap C between the pair of tip end portions 62e is 1.95 mm, and the wall thickness of the first retainer 62A is 0.25 mm.

As described above, in the optical module according to the fifth embodiment, the pair of first retainers 62A pressing the receptacle 5 are inclined in the direction in which the pair are brought close to each other as apart from the plate-shaped part 11. Therefore, contact points P1 of the first retainers 62A to the receptacle 5 are located on the lower side (the tip end side of first retainer 62A) of the center point P2 of the receptacle 5, and the pressing force X of the first retainer 62A works toward the upper side. Consequently, the receptacle 5 is pushed to the upper side (the root side of the first retainer 62A) of the first retainer 62A, and hence the receptacle 5 can hardly come off from the clip member 60.

The pair of second retainers 62B pressing the plug 6 are also inclined in the direction in which the pair are brought close to each other as apart from the plate-shaped part 11. Therefore, contact points P1 of the second retainers 62B to the plug 6 are located on the lower side of the center point P2 of the plug 6, and the pressing force X of the second retainer 62B works toward the upper side. Thus, similarly to the description above, the plug 6 is pushed to the upper side of the second retainer 62B, and hence the plug 6 can hardly come off from the clip member 60.

Thus, also in the vibration tests, impact tests, and any other tests described above, the first retainers 62A and the second retainers 62B can hardly come off from the receptacle 5 and the plug 6, respectively, and hence the fitting of the clip member 60 can be kept in vibration tests, impact tests, and any other tests. Note that in the fifth embodiment, an example is described in which the first retainers 62A and the second retainers 62B are inclined in the direction the retainers 62A and 62B are brought close to each other. However, one of the first retainers 62A and one of the second retainers 62B may be inclined in the direction the ones are brought close to each other, and the other of the first retainer 62A and the other of the second retainer 62B may not be inclined in the direction the others are brought close to each other.

As described above, the embodiments of the optical module according to the present invention are described. However, the optical module according to the present invention is not limited to the foregoing embodiments, which can be variously modified. That is, the configurations of the components of the optical module can be appropriately changed within the gist of claims. For example, in the foregoing embodiments, the clip member 10 is described in which the retainer 12 is provided at four corners of the plate-shaped part 11. However, the positions, numbers, and arrangement of the retainers can be appropriately changed. The shape, size, and material of the retainer can also be appropriately changed.

In the foregoing embodiments, the optical module 1 is described including the receptacle 5 having the stub 5a, the sleeve 5b, the flange 5c, and the cylindrical part 5d and the plug 6 including the stub 6a, the flange 6b, and the cylindrical part 6c. However, the shape, size, and material of the receptacle and the plug can be appropriately changed. In the foregoing embodiments, the plug is described as example of the optical fiber holding member. However, the optical fiber holding member may be a component other than the plug.

In the foregoing embodiments, the optical module 1 including the housing 2 and the optical fiber introduction part 3 is described. However, the materials, sizes, and shapes of the housing and the optical fiber introduction part can be appropriately changed. In the foregoing embodiments, the light source module (the wavelength tunable light source) is described as an example. However, the types, numbers, and arrangement of an optical element mounted in the inside of the housing can be appropriately changed.

In the foregoing embodiments, the coherent light source module mounted in the inside of the optical transceiver, i.e., the wavelength tunable light source is described. However, the optical module according to the present invention may be other optical modules, such as an integrated coherent receiver (ICR), transmitter optical sub-assembly (TOSA), receiver optical sub-assembly (ROSA), or a small-sized coherent optical sub-assembly (COSA) that is a module mounted with a silicon photonics having functions of a multi-level modulator and a receiver, or a transmitter-receiver optical sub assembly (TROSA).

The invention claimed is:

1. An optical connector comprising:
   a receptacle in a cylindrical shape, the receptacle being configured to hold a first optical fiber, the receptacle having a first flat surface on an outer surface thereof, the first flat surface being parallel with a first optical axis of the first optical fiber;
   an optical fiber holding member in a cylindrical shape, the optical fiber holding member being configured to hold a second optical fiber, the optical fiber holding member having a second flat surface on an outer surface thereof, the second flat surface being parallel with a second optical axis of the second optical fiber; and
   a clip member having a third flat surface in surface contact with the first flat surface and the second flat surface for aligning the first optical axis with the second optical axis, the clip member being configured to press the receptacle and the optical fiber holding member against each other for optically coupling the first optical fiber to the second optical fiber, wherein
   the clip member has a first retainer and a second retainer,
   the receptacle has a first cylindrical flange,
   the optical fiber holding member has a second cylindrical flange,
   the first retainer has a first protrusion configured to press the first cylindrical flange toward the second cylindrical flange, and the second retainer has a second protrusion configured to press the second cylindrical flange toward the first cylindrical flange, and
   the first protrusion of the first retainer and the second protrusion of the second retainer are each formed at an opposing side to face one another.

2. The optical connector according to claim 1, wherein
   the second optical fiber is a polarization maintaining fiber, and
   the second optical fiber has a slow axis or a fast axis each parallel with the third flat surface.

3. The optical connector according to claim 1, wherein
   the first optical fiber is a polarization maintaining fiber, and
   the first optical fiber has a slow axis or a fast axis each parallel with the third flat surface.

4. The optical connector according to claim 1, wherein
   the first cylindrical flange of the receptacle and the second cylindrical flange of the optical fiber holding member are made of a stainless steel or an alloy including stainless steel.

5. The optical connector according to claim 1, wherein
   the receptacle has a first recess, and the first protrusion of the first retainer of the clip member fits into the first recess.

6. The optical connector according to claim 1, wherein the optical fiber holding member has a second recess, and the second protrusion of the second retainer of the clip member fits into the second recess.

7. The optical connector according to claim 5, wherein the first recess is in a groove shape extending along a circumferential direction of the first cylindrical flange.

8. The optical connector according to claim 6, wherein the second recess is in a groove shape extending along a circumferential direction of the second cylindrical flange.

9. The optical connector according to claim 1, wherein the clip member includes a pair of first retainers and a plate-shaped part,
the first retainers extend from the plate-shaped part, and
the first retainers are inclined so that tips of the first retainers are brought close to each other as apart from the plate-shaped part.

10. The optical connector according to claim 1, wherein the clip member includes a pair of second retainers and a plate-shaped part,
the second retainers extend from the plate-shaped part, and
the second retainers are inclined so that tips of the second retainers are brought close to each other as apart from the plate-shaped part.

11. The optical connector according to claim 9, wherein the clip member includes a protruding part arranged between the first retainer and the second retainer.

12. The optical connector according to claim 11, wherein the protruding part is arranged with a middle of the first and the second retainer of the clip member.

13. An optical module comprising:
a receptacle to be used in the optical connector according to claim 1,
a housing having a window on which the receptacle is attached, the housing mounting an optical element,
wherein the housing has a bottom face, and the optical element emits light having a polarization plane parallel with or vertical to the bottom face, and the third flat surface is parallel with the bottom face.

14. The optical module according to claim 13, wherein the housing has a top face opposite to the bottom face of the housing, and the third flat surface is located between the bottom face and the top face, and
the receptacle has a first length from the first flat surface to an edge opposite to the first flat surface on the first cylindrical flange of the receptacle, and the optical fiber holding member has a second length from the second flat surface to an edge opposite to the second flat surface on the second cylindrical flange, the first length and the second length are shorter than a length from the bottom face to the top face of the housing.

15. A clip member configured to be used as the clip member of the optical connector according to the claim 1, comprising:
a pair of first retainers;
a pair of second retainers; and
a plate-shaped part connecting the pair of the first retainers to the pair of the second retainers, the plate-shaped part having a flat surface,
wherein the first retainers extend outward from the plate-shaped part, and the first retainers are inclined so that tips of the first retainers are brought close to each other as apart from the plate-shaped part, and
wherein the second retainers extend outward from the plate-shaped part, and the second retainers are inclined so that tips of the second retainers are brought close to each other as apart from the plate-shaped part.

16. The clip member according to claim 15, further comprising a protruding part,
wherein the protruding part is formed on the plate-shaped part in a middle of the pair of the first retainers and the pair of the second retainers.

* * * * *